United States Patent
Mates et al.

(10) Patent No.: US 12,472,072 B2
(45) Date of Patent: Nov. 18, 2025

(54) JOINT IMPLANT APPARATUS, SYSTEM, AND METHOD

(71) Applicant: Vilex LLC, Park City, UT (US)

(72) Inventors: Aaron K. Mates, Palm Harbor, FL (US); Brock Johnson, McMinnville, TN (US); Daniel J. Triplett, Smithfield, UT (US)

(73) Assignee: Vilex LLC, Park City, UT (US)

( * ) Notice: Subject to any disclaimer, the term of this patent is extended or adjusted under 35 U.S.C. 154(b) by 703 days.

(21) Appl. No.: 17/676,490

(22) Filed: Feb. 21, 2022

(65) Prior Publication Data
US 2023/0263637 A1 Aug. 24, 2023

(51) Int. Cl.
*A61F 2/42* (2006.01)
*A61F 2/30* (2006.01)

(52) U.S. Cl.
CPC ........ *A61F 2/4225* (2013.01); *A61F 2/30724* (2013.01); *A61F 2/30749* (2013.01); *A61F 2002/30462* (2013.01); *A61F 2002/3069* (2013.01); *A61F 2002/4233* (2013.01)

(58) Field of Classification Search
CPC ..................... A61F 2/42; A61F 2/4225; A61F 2002/30462; A61F 2002/4228; A61F 2002/4233; A61F 2002/4238
See application file for complete search history.

(56) References Cited

U.S. PATENT DOCUMENTS

| 8,157,867 B2 * | 4/2012 | Goble ................ A61B 17/1764 623/20.15 |
| 10,624,748 B2 * | 4/2020 | Ek ............................ A61F 2/40 |
| 2008/0051912 A1 | 2/2008 | Hollawell |
| 2012/0179268 A1 * | 7/2012 | Hollawell ............. A61F 2/4225 623/21.19 |

OTHER PUBLICATIONS

"Setting a new standard for treating hallux rigidus", Stryker, The Difference is Data, Cartiva Synthetic Cartilage Implant (2019) (https://www.cartiva.net/wp-content/uploads/2019/05/AP-011353A_12-Mar-2019_CARTIVA-Setting-New-Standard_4-4.pdf).
Toe implants, https://www.arthrosurface.com/toe-implants/ (accessed 2021).
Styker, "Implant Procedure « CARTIVA®_ Synthetic Cartilage Implant.pdf" the URL is https://www.cartiva.net/for-physicians/implant-procedure/, 2019.
Implants for Metatarsal Joint Pain, accessed Jan. 2022 (https://www.wellmark.com/Provider/MedpoliciesAndAuthorizations/MedicalPolicies/policies/Implants_for_Metatarsal_Joint_Pain.aspx).

* cited by examiner

*Primary Examiner* — Brian A Dukert
(74) *Attorney, Agent, or Firm* — David Meibos; Maywood IP Law

(57) ABSTRACT

An improved joint implant apparatus, system, and method. The system includes an implant having a bone-facing articular surface configured to replace at least part of a natural articular surface of a bone adjacent to a joint. The system also includes a transosseous coupler and a bone anchor configured to reside proximate another surface of the bone, separated from the natural articular surface by a bone tunnel. The bone anchor is configured to couple the transosseous coupler to the bone such that the transosseous coupler retains the implant in place on the natural articular surface of the bone.

6 Claims, 10 Drawing Sheets

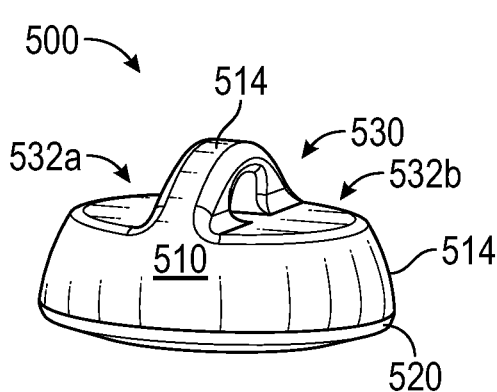
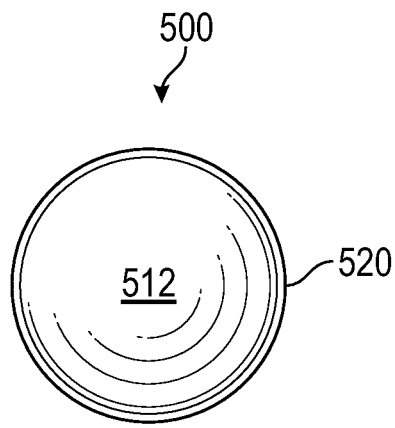
FIG. 5A  FIG. 5B
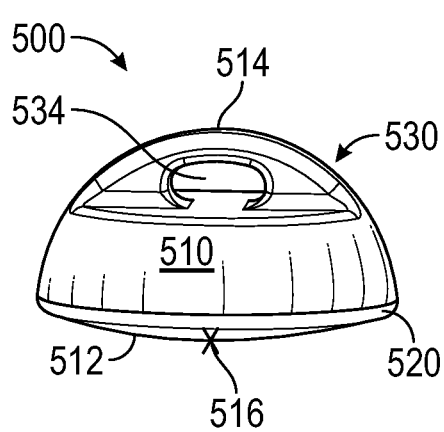
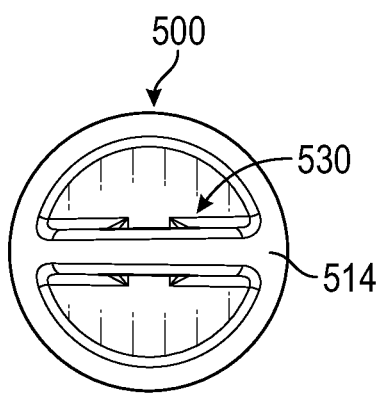
Fig. 5C  Fig. 5D
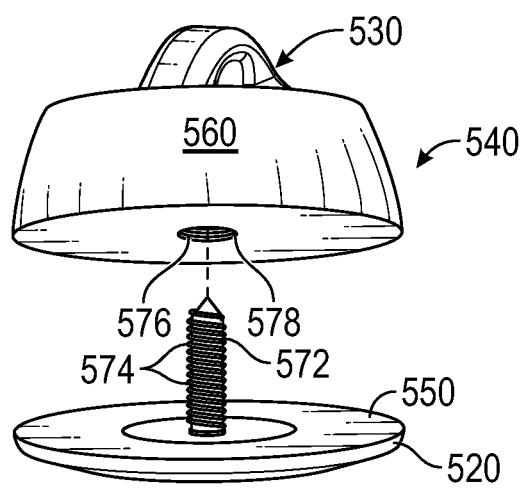
Fig. 5E

JOINT IMPLANT APPARATUS, SYSTEM, AND METHOD

TECHNICAL FIELD

The present disclosure relates to surgical systems, methods, instruments, and/or devices. More specifically, the present disclosure relates to improved surgical systems, methods, devices, and/or instruments for mitigating effects of arthritis and/or osteochondral defects (OCD), such as osteochondral lesions (OCL) within a joint of a patient's body.

BACKGROUND

Many patients suffer with joint pain and/or reduced joint kinematics. Various conditions may affect skeletal joints such as the injury, disease, deterioration, elongation, shortening, or rupture of soft tissues, cartilage, and/or bone associated with the joint and consequent laxity, pain, loss of movement, and/or deformity. Such conditions can adversely impact the daily activities of the patient.

The medical industry uses a variety of procedures to address these conditions, including: various osteotomy procedures, joint fusion procedures, fracture fixation procedures, joint resurfacing procedures, implants, joint spacers, and the like. Such procedures can be performed throughout the body and on various joints of the body.

However, these procedures, devices, and/or system have limitations. For example, certain procedures may remove a high percentage of bone of an articular surface of the joint. Other procedures may fuse the joint which may address pain but can limit mobility and activity of the patient. Other procedures and/or prosthesis may be prone to periprosthetic fractures and/or prosthetic dislocation.

Accordingly, a need exists for an improved joint implant apparatus, system, and method that removes minimal bone material, mechanically secures the implant, secures the implant with an adjustable level of tension, enables natural movement of the joint, and provides adjunctive fixation.

SUMMARY

The various apparatus, devices, systems, and/or methods of the present disclosure have been developed in response to the present state of the art, and in particular, in response to the problems and needs in the art that have not yet been fully solved by currently arthroplasty and/or implants. One general aspect of the present disclosure can include an implant having a joint-facing articular surface configured to replace at least part of a natural articular surface of a bone adjacent to a joint, and a transosseous coupler. The system may include a bone anchor configured to reside proximate another surface of the bone. The bone anchor can be separated from the natural articular surface by a bone tunnel. The system may include a transosseous coupler configured to couple the implant to the bone anchor and the bone anchor may be configured to couple the transosseous coupler to the bone such that the transosseous coupler retains the implant in place on the natural articular surface of the bone.

Implementations may include one or more of the following features. The system in which the transosseous coupler applies tension on the implant, where the tension holds the joint-facing articular surface in place on a distal end of the bone. A first diameter of the joint-facing articular surface is smaller than a second diameter of the natural articular surface of the bone. A first diameter of the joint-facing articular surface is greater than a width of an osteochondral lesion (OCL) of the natural articular surface and smaller than a second diameter of the natural articular surface of the bone. The system may include an implant that may include a body having a joint-facing articular surface, a convex posterior surface, and an edge between the joint-facing articular surface and the convex posterior surface. The bone tunnel may include a distal end and a proximal end and the proximal end exits between a distal end of the bone and a proximal end of the bone; and the distal end of the bone tunnel exits within a bone pocket that extends proximally from the natural articular surface into the bone. The implant may be coupled to the bone anchor by a transosseous coupler. A body of the implant may seat within the bone pocket with the edge extending above the natural articular surface of the bone. The joint-facing articular surface may be convex and a top of the joint-facing articular surface may be congruent with cartilage around the implant. The joint-facing articular surface may be convex with the edge being circular. The convex posterior surface may have an implant radius greater than a bone radius of the bone pocket. The transosseous coupler may include a tether configured to engage with a first connector coupled to the implant and configured to engage with a second connector coupled to the bone anchor.

In one aspect, for certain implementations the implant may include a body that includes a joint-facing articular surface, a posterior surface configured to seat within a bone pocket, and a shoulder between the joint-facing articular surface and the posterior surface. The shoulder may engage a natural articular surface of the bone when the implant is coupled by a transosseous coupler to the bone.

One general aspect of the present disclosure can include an arthroplasty implant configured to engage a distal articular surface of a metatarsal bone; a bone anchor secured to the metatarsal bone away from the distal articular surface, and a tether configured to couple the arthroplasty implant and the bone anchor.

Implementations may include one or more of the following features. The arthroplasty implant system may include an arthroplasty implant that may include: an articular implant where the articular implant is embedded within a bone pocket of the distal articular surface when the tether couples the articular implant to the bone anchor such that bone pocket retains the articular implant in place during osseointegration of the articular implant to the metatarsal bone. The arthroplasty implant may include a spacer configured to maintain separation between the distal articular surface and an articular surface of an adjacent phalanx bone. The arthroplasty implant may include: a body having a joint-facing articular surface and a convex posterior surface configured to engage the distal articular surface by way of a bone pocket formed within the distal articular surface; an edge between the joint-facing articular surface and the convex posterior surface; and a connector configured to engage with the tether and secure the arthroplasty implant to the tether.

The tether couples the arthroplasty implant to the bone anchor through a bone tunnel that extends from the bone pocket such that when the tether couples the arthroplasty implant to the bone anchor at least a portion of the edge contacts a surface of the bone pocket below the distal articular surface. The bone tunnel may include a proximal opening near a dorsal surface of the metatarsal bone. The bone anchor sits within the bone tunnel and within the proximal opening and the bone anchor may include: a cylindrical body may include an opening that extends from one end of the cylindrical body to the other end and external threads on an outside surface of the cylindrical body, the external threads configured to engage an internal surface of the bone tunnel, and a tether locking feature configured to sit within the opening of the cylindrical body and couple a proximal end of the tether to the bone anchor. The arthroplasty implant may seat within the bone pocket such that a top of the joint-facing articular surface is congruent with or below a surface of surrounding cartilage of the distal articular surface and the edge is below the surface of surrounding cartilage when the tether couples the arthroplasty implant to the bone anchor.

One general aspect of the present disclosure can include an articular implant system for a metatarsophalangeal joint, the system having an implant configured to seat within a bone pocket of an articular surface of a metatarsal, the implant may include: a convex distal surface; a semispherical proximal surface that extends from the convex distal surface, the semispherical proximal surface having an implant radius that matches a bone radius of the bone pocket; and where the semispherical proximal surface engages a surface of the bone pocket to retain the implant within the bone pocket.

Implementations may include one or more of the following features. The articular implant system may include: a tether that may include a distal end and a proximal end, the distal end configured to connect the tether to the implant; an anchor configured to secure the proximal end of the tether to the metatarsal away from the bone pocket; and where the anchor and tether adjunctively secure the implant to the metatarsal. The implant may include: a distal body that may include the convex distal surface; a proximal body that may include the semispherical proximal surface; and a fastener configured to couple the distal body to the proximal body.

One general aspect of the present disclosure can include a method for deploying an articular implant in a metatarsophalangeal (MTP) joint of a patient. The method includes forming a bone pocket in an articular surface of a metatarsal bone, the bone pocket sized and positioned to resect at least one osteochondral lesion; forming a bone tunnel may include a distal tunnel end and a proximal tunnel end, the bone tunnel configured such that the distal tunnel end connects the bone pocket and the proximal tunnel end connects to an external surface of the metatarsal bone; passing a tether between the distal tunnel end and the proximal tunnel end of the bone tunnel, the tether having a distal tether end and a proximal tether end; securing the distal tether end to an articular implant; and securing the proximal tether end within the bone tunnel.

Implementations may include one or more of the following features. The method may also include: reaming the articular implant out of the bone pocket to a size that supports a second articular implant having a greater diameter than the articular implant; restoring the bone tunnel; passing a second tether through the restored bone tunnel; securing a distal tether end of the second tether to the second articular implant; and securing a proximal tether end of the second tether within the restored bone tunnel as at least part of a revision procedure.

BRIEF DESCRIPTION OF THE DRAWINGS

Exemplary embodiments of the disclosure will become more fully apparent from the following description and appended claims, taken in conjunction with the accompanying drawings. Understanding that these drawings depict only exemplary embodiments and are, therefore, not to be considered limiting of the scope of the appended claims, the exemplary embodiments of the present disclosure will be described with additional specificity and detail through use of the accompanying drawings.

FIG. 5A is a perspective view of an implant according to one embodiment.

FIG. 5B is bottom view of the implant of FIG. 5A according to one embodiment.

FIG. 5C is perspective side view of the implant of FIG. 5A according to one embodiment.

FIG. 5D is a top view of the implant of FIG. 5A according to one embodiment.

FIG. 5E is a perspective exploded view of an implant according to another embodiment.

Figure 1:
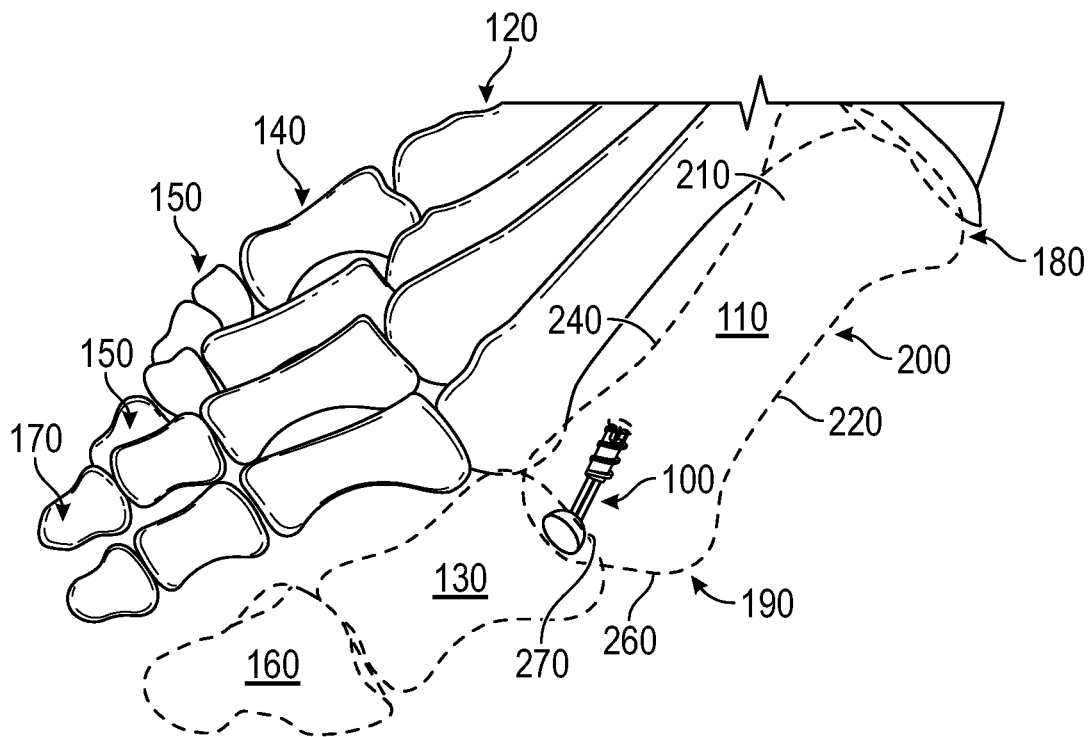
FIG. 1 is a perspective view of foot joint illustrating an implant system according to one embodiment.

It is to be understood that the drawings are for purposes of illustrating the concepts of the disclosure and may or may not be drawn to scale. Furthermore, the drawings illustrate exemplary embodiments and do not represent limitations to the scope of the present disclosure.

DETAILED DESCRIPTION

Exemplary embodiments of the present disclosure will be best understood by reference to the drawings, wherein like parts are designated by like numerals throughout. It will be readily understood that the components of the present disclosure, as generally described and illustrated in the Figures herein, could be arranged and designed in a wide variety of different configurations. Thus, the following more detailed description of the embodiments of the apparatus and method, as represented in the Figures, is not intended to limit the scope of the present disclosure, as claimed in this or any other application claiming priority to this application but is merely representative of exemplary embodiments of the present disclosure.

Standard medical planes of reference and descriptive terminology are employed in this disclosure. While these terms are commonly used to refer to the human body, certain terms are applicable to physical objects in general. A standard system of three mutually perpendicular reference planes is employed. A sagittal plane divides a body into right and left portions. A coronal plane divides a body into anterior and posterior portions. A transverse plane divides a body into superior and inferior portions. A mid-sagittal, mid-coronal, or mid-transverse plane divides a body into equal portions, which may be bilaterally symmetric. The intersection of the sagittal and coronal planes defines a superior-inferior or cephalad-caudal axis. The intersection of the sagittal and transverse planes defines an anterior-posterior axis. The intersection of the coronal and transverse planes defines a medial-lateral axis. The superior-inferior or cephalad-caudal axis, the anterior-posterior axis, and the medial-lateral axis are mutually perpendicular. Anterior means toward the front of a body.

Posterior means toward the back of a body. Superior or cephalad means toward the head. Inferior or caudal means toward the feet or tail. Medial means toward the midline of a body, particularly toward a plane of bilateral symmetry of the body. Lateral means away from the midline of a body or away from a plane of bilateral symmetry of the body. Axial means toward a central axis of a body. Abaxial means away from a central axis of a body. Ipsilateral means on the same side of the body. Contralateral means on the opposite side of the body. Proximal means toward the trunk of the body. Proximal may also mean toward a user, viewer, or operator. Distal means away from the trunk. Distal may also mean away from a user, viewer, or operator. Dorsal means toward the top of the foot. Plantar means toward the sole of the foot. Antegrade means forward moving from a proximal location/position to a distal location/position or moving in a forward direction. Retrograde means backward moving from a distal location/position to a proximal location/position or moving in a backwards direction. Sagittal refers to a midline of a patient's anatomy, which divides the body into left or right halves. The sagittal plane may be in the center of the body, splitting it into two halves. Prone means a body of a person lying face down. Supine means a body of a person lying face up.

As used herein, "preoperative" or "PRE-OP" refers to any activity, method, feature, or aspect performed before a surgical procedure. As used herein, "intraoperative" or "INTRA-OP" refers to any activity, method, feature, or aspect performed during a surgical procedure. As used herein, a "fixation" or "fixation device" refers to an apparatus, instrument, structure, device, component, member, system, assembly, step, process, or module structured, organized, configured, designed, arranged, or engineered to connect two structures either permanently or temporarily. The two structures may be one or the other or both of man-made and/or biological tissues, hard tissues such as bones, teeth or the like, soft tissues such as ligament, cartilage, tendon, or the like. In certain embodiments, fixation is used as an adjective to describe a device or component or step in securing two structures such that the structures remain connected to each other in a desired position and/or orientation. Fixation devices can also serve to maintain a desired level of tension, compression, or redistribute load and stresses experienced by the two structures and can serve to reduce relative motion of one part relative to others. Examples of fixation devices are many and include both those for external fixation as well as those for internal fixation and include, but are not limited to, pins, wires, Kirschner wires (K-wires), screws, anchors, bone anchors, plates, bone plates, intramedullary nails or rods or pins, implants, interbody cages, fusion cages, and the like.

As used herein, a "deploy" or "deployment" refers to an act, action, process, system, method, means, or apparatus for inserting an implant or prosthesis into a part, body part, and/or patient. "Deploy" or "deployment" can also refer to an act, action, process, system, method, means, or apparatus for placing something into therapeutic use. A device, system, component, medication, drug, compound, or nutrient may be deployed by a human operator, a mechanical device, an automated system, a computer system or program, a robotic system, or the like.

"Cortical bone" refers to a type of bone tissue. Cortical bone is a type of bone tissue typically found between an external surface of a bone and an interior area of the bone. Cortical bone is more dense and typically stronger structurally than other types of bone tissue.

As used herein, "implant" refers to a medical device manufactured to replace a missing biological structure, support a damaged biological structure, or enhance an existing biological structure. Often medical implants are man-made devices, but implants can also be natural occurring structures. The surface of implants that contact the body may be made of, or include a biomedical material such as titanium, cobalt chrome, stainless steel, carbon fiber, another metallic alloy, silicone, polymer, Synthetic polyvinyl alcohol (PVA) hydrogels, biomaterials, biocompatible polymers such as PolyEther Ether Ketone (PEEK) or a polylactide polymer (e.g. PLLA) and/or others, or apatite, or any combination of these depending on what is functional and/or economical. Implants can have a variety of configurations and can be wholly, partially, and/or include a number of components that are flexible, semiflexible, pliable, elastic, supple, semi-rigid, or rigid.

In some cases implants contain electronics, e.g. artificial pacemaker and cochlear implants. Some implants are bioactive, such as subcutaneous drug delivery devices in the form of implantable pills or drug-eluting stents. Orthopedic implants may be used to alleviate issues with bones and/or joints of a patient's body.

Orthopedic implants can be used to treat bone fractures, osteoarthritis, scoliosis, spinal stenosis, discomfort, and pain. Examples of orthopedic implants include, but are not limited to, a wide variety of pins, rods, screws, anchors, spacers, sutures, all-suture implants, ball all-suture implants, self-locking suture implants, cross-threaded suture implants, plates used to anchor fractured bones while the bones heal or fuse together, and the like. (Search "implant (medicine)" on Wikipedia.com May 26, 2021. CC-BY-SA 3.0 Modified. Accessed Jun. 30, 2021.)

As used herein, "attribute" refers to any property, trait, aspect, quality, data value, setting, or feature of an object or thing.

The phrases "connected to," "coupled to" and "in communication with" refer to any form of interaction between two or more entities, including mechanical, electrical, magnetic, electromagnetic, fluid, and thermal interaction. Two components may be functionally coupled to each other even though they are not in direct contact with each other. The term "abutting" refers to items that are in direct physical contact with each other, although the items may not necessarily be attached together. The phrase "fluid communication" refers to two features that are connected such that a fluid within one feature is able to pass into the other feature.

The word "exemplary" is used herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Various conditions may adversely affect skeletal joints such as the injury, disease, deterioration, elongation, shortening, or rupture of soft tissues, cartilage, and/or bone associated with the joint and consequent laxity, pain, loss of movement, and/or deformity. As mentioned, a variety of procedures can be used to address these conditions, including: various osteotomy procedures, joint fusion procedures, fracture fixation procedures, joint resurfacing procedures, implants, joint spacers, and the like. Such procedures can be performed throughout the body and on various joints of the body.

However, these procedures, devices, and/or system have limitations. For example, certain procedures may remove a high percentage of bone of an articular surface of the joint. Other procedures may fuse the joint which may address pain but can limit mobility and activity of the patient. Other procedures and/or prosthesis may be prone to periprosthetic fractures and/or prosthetic dislocation.

The present disclosure discloses an improved joint implant apparatus, system, and method that removes minimal bone material, mechanically secures the implant, secures the implant with an adjustable level of tension, enables or maintains more natural movement of the joint, and provides adjunctive fixation.

FIG. 1 is a perspective view of foot joint illustrating an implant system 100 according to one embodiment. The implant system 100 can be used on a variety of joints within the body of a patient. "Joint" or "Articulation" refers to the connection made between bones in a human or animal body which link the skeletal system to form a functional whole. Joints may be biomechanically classified as a simple joint, a compound joint, or a complex joint. Joints may be classified anatomically into groups such as joints of hand, elbow joints, wrist joints, axillary joints, sternoclavicular joints, vertebral articulations, temporomandibular joints, sacroiliac joints, hip joints, knee joints, articulations of foot, and the like. (Search "joint" on Wikipedia.com Dec. 19, 2021. CC-BY-SA 3.0 Modified. Accessed Jan. 20, 2022.)

FIG. 1 illustrates one exemplary embodiment of an implant system 100 that can be used with one or more joints of the foot. The foot includes a number of joints and a number of bones, not all of the bones and joints are described herein to provide clarity for the present disclosure.

FIG. 1 illustrates a few of the bones and joints where an implant system 100 can be deployed. FIG. 1 illustrates a number of bones of a foot including a first metatarsal 110, other metatarsal bones 120, a first proximal phalanx 130, other proximal phalanges 140, intermediate phalanges 150, a first distal phalanx 160, and other distal phalanges 170.

The first metatarsal 110 includes a proximal end 180 (also referred to as a base), a distal end 190 (also referred to as a head), and a body 200 that connects the proximal end 180 and the distal end 190. The body 200 includes a dorsal surface 210, a plantar surface 220, a medial surface 230, and a lateral surface 240.

For sake of clarity, while embodiments can be used on other joints of a patient, this disclosure will describe embodiments with respect to the metatarsophalangeal (MTP) joint. Those of skill in the art will appreciate that embodiments within the scope of the present disclosure will not and are not limited to those use and implementation in the MTP joint alone and that embodiments of the disclosed solution can be used in one or more other joints of a patient. The metatarsophalangeal (MTP) joint is a joint between a metatarsal and a proximal phalangeal bone (phalanx) of a toe of the foot. More specifically, this disclosure will focus on exemplary embodiments that can be used on the MTP joint 250 between the first metatarsal 110 and the first proximal phalanx 130.

The MTP joint 250 includes an articular surface of the first metatarsal 110, an articular surface of the first proximal phalanx 130, and one or more layers of cartilage (not shown). In certain embodiments, the articular surface of the first metatarsal 110 is a natural articular surface 260 and the articular surface of the first proximal phalanx 130 is also a natural articular surface 270. Of course either surface (260, 270) or both surfaces (260, 270) can be artificial articular surfaces. "Articular surface" refers to a surface of a structure that is coupled to, and may cooperate with, other structures of a joint of a human or animal to enable movement of structures of the joint. A natural articular surface is an articular surface created as part of natural, or human facilitated, cellular growth and development of bones of a patient.

Figure 2:
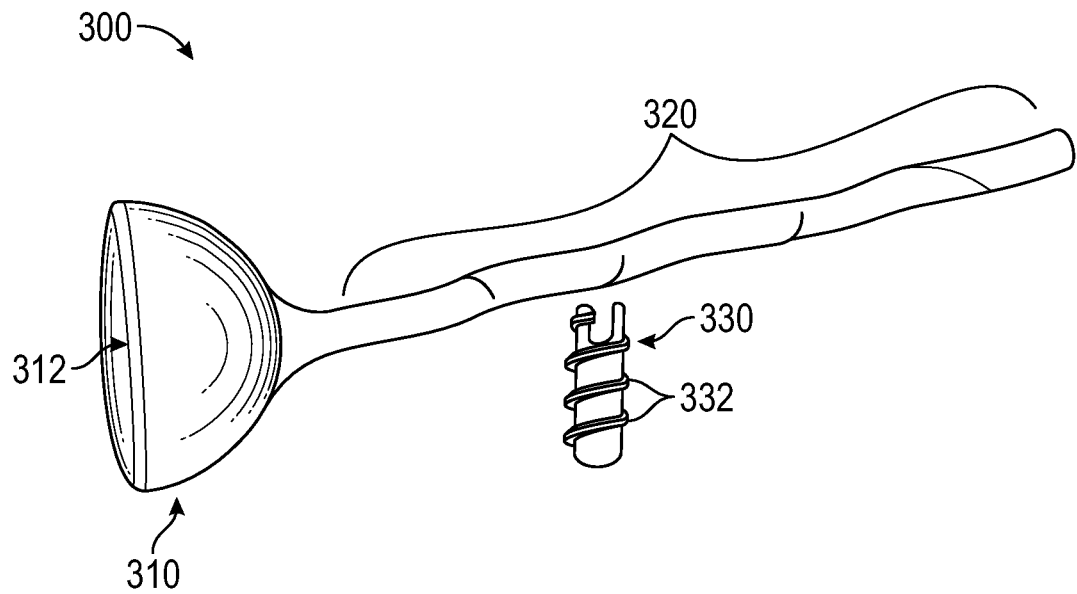
FIG. 2 is a perspective view of a system for use on a foot joint according to one embodiment.

FIG. 2 is a perspective view of a system 300 for use on a foot joint according to one embodiment. The system 300 includes an implant 310, a transosseous coupler 320, and a bone anchor 330.

The implant 310 serves to provide a structure that can be used to replace at least a portion of a natural articular surface of a bone (i.e., natural articular surface 260). The implant 310 can have a variety of shapes, come in different sizes, be made of different materials or combinations of materials (i.e., composites or alloys), and/or a variety of different designs.

In one embodiment, the implant 310 includes a joint-facing articular surface 312. A joint-facing articular surface 312 is a surface that faces a joint, such as MTP joint 250. The joint-facing articular surface 312 can replace at least part of a natural articular surface of a bone adjacent to a joint. For example, in FIG. 1, the joint-facing articular surface 312 may replace at least part of the natural articular surface 260 of the first metatarsal 110 in an MTP joint 250. Of course, the implant 310 may be deployed on any articular surface of a joint of the patient. In certain embodiments, the joint-facing articular surface 312 is a smooth surface that minimizes friction between the joint-facing articular surface 312 and other articular surfaces of a joint. The size of the joint-facing articular surface 312 may vary according to the needs of the patient. In certain embodiments, the joint-facing articular surface 312 is sized to be just larger in diameter than a lesion or other area of the natural articular surface 260 being replaced. In other embodiments, the joint-facing articular surface 312 is as large in diameter or greater in diameter than the natural articular surface 260.

In certain embodiments, the implant 310 and/or the joint-facing articular surface 312 may be a structure different from a rigid structure. For example, in one embodiment, the joint-facing articular surface 312 may be a suture ball. A suture ball is generally a length of suture material gathered into collection of loops, lengths, bends, and/or twists of one or more lengths of suture such that the collection covers a particular area and may resemble a ball shape. In certain embodiments, a suture ball may be a knotless suture in which one or more ends of the knotless suture may be pulled and thereby cause the knotless suture to bunch up or cinch up into a collection of loops, lengths and bends and twists. An implant 310 embodied as a suture ball may have less coefficient of friction than an implant 310 with a rigid joint-facing articular surface 312. Further, implant 310 embodied as a suture ball may be softer than an implant 310 with a rigid joint-facing articular surface 312.

The terms "suture" and/or "suture strand" are used herein to mean any strand or flexible member, natural or synthetic, able to joint tissue of a patient and/or to be anchored in a bone tunnel or to hard tissue and useful in a surgical procedure. In certain embodiments, "suture" and/or "suture strand" refers to a flexible line or flexible member of natural material, natural biological material, biomaterial, biomimetic materials, manmade material, or a combination of these either in a single structure, a composite structure, or a plurality of tissue structures that extend in parallel and/or may be woven or bonded together. In certain embodiments, a suture may be long and thin. In certain embodiments, a suture may be planar or may be elastic or inelastic. Examples of a suture include, but are not limited to, a thread, a suture, suture tape, a woven structure, a fibrous material, a cord, and/or any of these in combination with each other, and the like.

The transosseous coupler 320 serves to couple an implant 310 to a bone. The transosseous coupler 320 may create a direct coupling or an indirect coupling by way of one or more other components or structures. The direct coupling or an indirect coupling may be between the transosseous coupler 320 and the implant 310, between the transosseous coupler 320 and the bone, and/or between the implant 310 and a structure coupled to bone. The transosseous coupler 320 can have a variety of shapes, come in different sizes, be made of different materials or combinations of materials (i.e., composites or alloys), and/or a variety of different designs.

As used herein, "coupling", "coupling member", or "coupler" refers to a mechanical device, apparatus, member, component, or structure, that is organized, configured, designed, arranged, or engineered to connect, or facilitate the connection of, the two or more parts, objects, or structures. In certain embodiments, a coupling can connect adjacent parts or objects at their ends. In certain embodiments, a coupling can be used to connect two shafts together at their ends for the purpose of transmitting power. In other embodiments, a coupling can be used to join two pieces of rotating equipment while permitting some degree of misalignment or end movement or both. In certain embodiments, couplings may not allow disconnection of the two parts, such as shafts during operation. (Search "coupling" on Wikipedia.com Jul. 26, 2021. CC-BY-SA 3.0 Modified. Accessed Jul. 27, 2021.) A coupler may be flexible, semi-flexible, pliable, elastic, or rigid. A coupler may join two structures either directly by connecting directly to one structure and/or directly to the other or indirectly by connecting indirectly (by way of one or more intermediary structures) to one structure, to the other structure, or to both structures. "Transosseous" refers to a structure, activity, action, or motion that crosses through bone or passes through bone.

In certain embodiments, the transosseous coupler 320 is part of, or formed together with, the implant 310 such that the transosseous coupler 320 and implant 310 are a single unitary component. In other embodiments, the transosseous coupler 320 is part of, or formed together with, a bone anchor 330 such that the transosseous coupler 320 and bone anchor 330 are a single unitary component. In still other embodiments, the transosseous coupler 320 may be a separate and distinct structure that may be coupled to either or both of an implant 310 and/or a bone anchor 330.

FIG. 2 illustrates an embodiment in which the transosseous coupler 320 is part of the implant 310. The transosseous coupler 320 may be made of the same material or different material from the implant 310. In the illustrated embodiment, the transosseous coupler 320 is flexible and is an elongated structure. The transosseous coupler 320 is long enough to couple the implant 310 to a bone fixation point and/or to a bone anchor 330. The transosseous coupler 320 is configured and designed to apply a tension force between the implant 310 and a bone fixation point and/or to a bone anchor 330. As used herein, a "tension" refers to a force that is applied to both ends of a structure. The structure may have a variety of shapes including fat, thin, wide, elongated, or the like. In one example, a ligament such as a lateral collateral ligament may experience tension due to how the ligament is attached to a femur bone and tibia bone and stretched during flexing of the knee joint. In another example, a tether, suture, or other structure may experience and/or transfer tension as the structure is connected between an implant and an anchor, such as a bone anchor.

In certain embodiments, the transosseous coupler 320 is a flexible member such as a suture, knotless suture, suture ball, suture connected to a suture ball, or the like. In such an embodiment, the flexible transosseous coupler 320 may be coupled to, couplable to, or otherwise joined to one, or the other, or both of the implant 310 and the bone anchor 330 or a bone fixation point.

The bone anchor 330 serves to couple the transosseous coupler 320 to bone. As used herein, an "anchor" refers to an apparatus, instrument, structure, member, part, device, component, system, or assembly structured, organized, configured, designed, arranged, or engineered to secure, retain, stop, and/or hold, an object to or at a fixed point, position, or location. Often, an anchor is coupled and/or connected to a flexible member such as a tether, chain, rope, wire, thread, suture, suture tape, or other like object. Alternatively, or in addition, an anchor may also be coupled, connected, and/or joined to a rigid object or structure. In certain embodiments, an anchor can be a fixation device. Said another way, a fixation device can function as an anchor. A bone anchor is an anchor, a type of fixation device, that can engage bone and can couple or connect another structure to bone. In certain embodiments, the bone anchor is a corkscrew anchor.

Those of skill in the art will appreciate that a variety of different bone anchor 330 may be used with the present disclosure. Each of these is considered within the scope of the claims which define the presented solution. A few example bone anchors are illustrated and described herein.

In the illustrated embodiment, the bone anchor 330 is a cylindrical screw fastener configured to engage with walls of a bone tunnel and secure the transosseous coupler 320 to a wall of the bone tunnel. In one example embodiment, the bone anchor 330 may include external threads 332 configured to engage with walls of a bone tunnel. In one embodiment, the bone anchor 330 may engage an end of the transosseous coupler 320 and press the end against a wall of the bone tunnel. In this manner, the bone anchor 330 may secure the end of the transosseous coupler 320 to bone such that the transosseous coupler 320 retains the implant 310 in place on the natural articular surface (i.e., natural articular surface 260) of the bone. The bone anchor 330 and transosseous coupler 320 may be coupled to each other using an interference fit between the bone anchor 330 and the bone. The transosseous coupler 320 may couple the implant 310 to the bone anchor 330.

Figure 3:
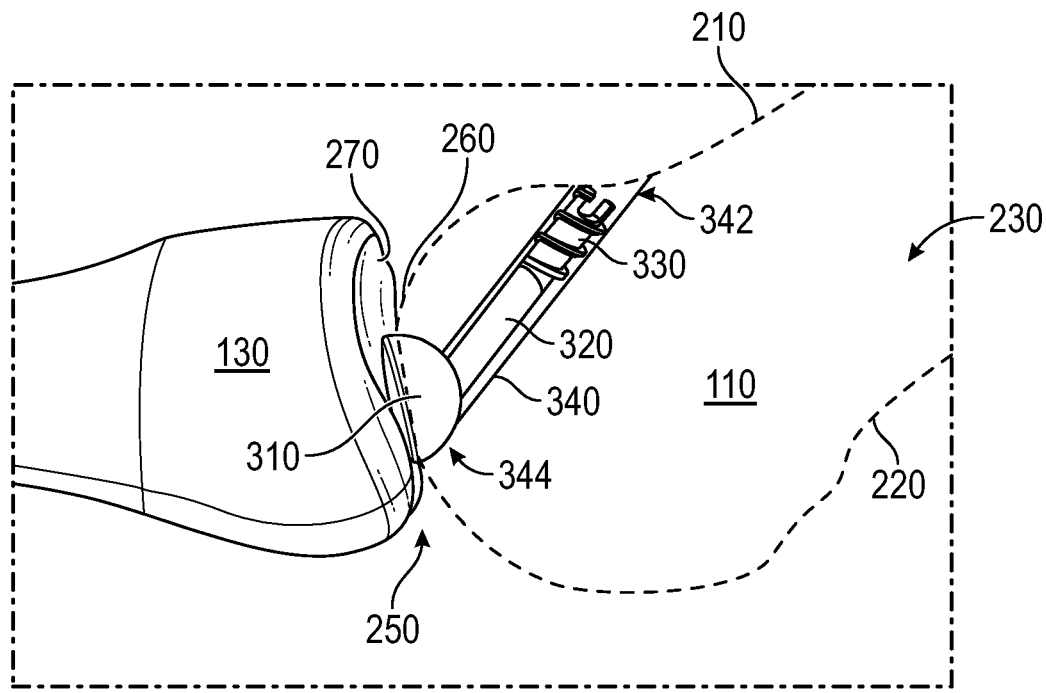
FIG. 3 is a perspective side view of the system of FIG. 2 deployed on a foot joint according to one embodiment.

FIG. 3 is a perspective side view of the system of FIG. 2 deployed on a foot joint according to one embodiment. FIG. 3 illustrates an MTP joint 250 between a first proximal phalanx 130 and a first metatarsal 110. In one embodiment, the first metatarsal 110 may include a bone tunnel 340. The bone tunnel 340 may include a proximal end 342 and a distal end 344.

The bone tunnel 340 may be one type of opening. As used herein, an "opening" refers to a gap, a hole, an aperture, a port, a portal, a space or recess in a structure, a void in a structure, or the like. In certain embodiments, an opening can refer to a structure configured specifically for receiving something and/or for allowing access. In certain embodiments, an opening can pass through a structure. In other embodiments, an opening can exist within a structure but not pass through the structure. An opening can be two-dimensional or three-dimensional and can have a variety of geometric shapes and/or cross-sectional shapes, including, but not limited to a rectangle, a square, or other polygon, as well as a circle, an ellipse, an ovoid, or other circular or semi-circular shape. As used herein, the term "opening" can include one or more modifiers that define specific types of "openings" based on the purpose, function, operation, position, or location of the "opening." As one example, a "fastener opening" refers to an "opening" adapted, configured, designed, or engineered to accept or accommodate a "fastener."

In one embodiment, the bone tunnel 340 extends from the natural articular surface 260 of a bone, such as a first metatarsal 110, to another surface of the bone. The another surface can be one of the dorsal surface 210, the plantar surface 220, the medial surface 230, and/or the lateral surface 240 (not shown in FIG. 3). The proximal end 342 may exit at, or near, the another surface. In the illustrated embodiment, the proximal end 342 exits at, or near, the dorsal surface 210. The distal end 344 may exit directly on the natural articular surface 260. In another embodiment, the distal end 344 may exit indirectly onto the natural articular surface 260 by way of another structure, such as a recess or opening, such as a bone pocket (described in more detail below). The length and diameter of the bone tunnel 340 can vary based on a variety of factors including the age, gender, health, size, the joint involved, and/or bone condition of a patient. In one embodiment, the diameter may be between about 1.5 mm and 1.6 mm and the length may be between about 10 mm to about 15 mm.

Furthermore, the another surface for the proximal end 342 to exit can vary based on similar factors, including surgeon preference. Having the proximal end 342 exit at, or near the dorsal surface 210 may be advantageous because this location may facilitate access by a surgeon for the procedure. In addition, the bone tunnel 340 may be positioned proximal to or through a physes or epiphyseal plate such that bone growth that closes the bone tunnel 340 after the procedure and during healing may be rapid and complete. In this manner, the system 300 serves as provisional, adjunctive, or temporary fixation until the bone heals and osseointegrates the implant 310 into the bone.

FIG. 3 illustrates one embodiment in which the bone anchor 330 resides proximate to the another surface (e.g., dorsal surface 210) and is separated from the natural articular surface 260 by the bone tunnel 340. The bone anchor 330 may be of a number of different varieties. In one embodiment, the bone anchor 330 is an interference screw that seats within the proximal end 342. The interference screw may secure a free end of the transosseous coupler 320 to an inside wall of the bone tunnel 340. The bone anchor 330 couples the transosseous coupler 320 to the bone (e.g., first metatarsal 110) such that the transosseous coupler 320 retains the implant 310 in place on the natural articular surface 260. Once deployed the transosseous coupler 320 applies tension on the implant 310. The tension is applied in the direction of the bone anchor 330. The tension holds the joint-facing articular surface 312 in place on the distal end 190 of the bone (e.g., first metatarsal 110). In certain embodiments, the tension provides provisional, adjunctive, or temporary fixation until the bone heals and osseointegrates the implant 310 into the bone.

Figure 4:
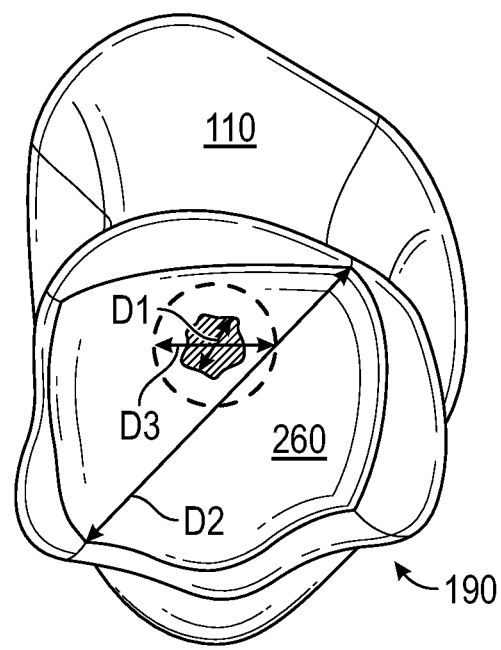
FIG. 4 is an anterior view of a natural articular surface of a bone.

FIG. 4 is an anterior view of a natural articular surface of a bone. The bone may be a first metatarsal 110 and the natural articular surface maybe the natural articular surface 260 of the head of the first metatarsal 110. In this example, the natural articular surface 260 includes an osteochondral lesion (OCL) 350. As used herein, an "osteochondral lesion" (OCL) is a lesion within the cartilage covering at least a portion of a bone at a joint. As used herein, a "lesion" refers to any damage or abnormal change in the tissue of an organism, usually caused by disease or trauma. (Search "lesion" on Wikipedia.com 20 Oct. 2021. CC-BY-SA 3.0 Accessed Dec. 1, 2021.)

Advantageously, the OCL 350 may have a diameter D1 that is smaller than a diameter D2 of the natural articular surface 260. In certain embodiments, the system 300 can be used to treat the OCL 350 such that a minimal amount of bone and/or soft tissue of the natural articular surface 260 is removed for the procedure.

For example, a surgeon may select a size of implant 310 with a diameter D3 (the diameter of the joint-facing articular surface 312) that is smaller than the diameter D2 of the natural articular surface 260 of the bone and greater than a diameter D1, or width, of the OCL 350. The diameter D3 of the implant 310 may maintain a 1-2 mm gap between the joint-facing articular surface 312 and an edge of the natural articular surface 260. The system 300, when deployed, results in minimal bone removal. Retaining bone on the natural articular surface 260 can promote mobility and use of the joint and provide options for future treatments of the joint, such as in a revision, for example, if a condition reemerges or gets worse over time.

FIGS. 5A-5D is a perspective view, bottom view, perspective side view, and top view, respectively of an implant 500 according to one embodiment. The embodiment of these figures is but one example of a variety of different implants and/or implant configurations that can be used with the present disclosure.

In the illustrated embodiment, the implant 500 is a solid structure that includes a body 510 and an edge 520. As used herein, a "body" refers to a main or central part of a structure. The body may serve as a structural component to connect, interconnect, surround, enclose, and/or protect one or more other structural components. A body may be made from a variety of materials including, but not limited to, metal, plastic, ceramic, wood, fiberglass, acrylic, carbon, biocompatible materials, biodegradable materials or the like. A body may be formed of any biocompatible materials, including but not limited to biocompatible metals such as Titanium, Titanium alloys, stainless steel alloys, cobalt-chromium steel alloys, nickel-titanium alloys, shape memory alloys such as Nitinol, biocompatible ceramics, and biocompatible polymers such as Polyether ether ketone (PEEK) or a polylactide polymer (e.g. PLLA) and/or others. In one embodiment, a body may include a housing or frame or framework for a larger system, component, structure, or device. A body may include a modifier that identifies a particular function, location, orientation, operation, and/or a particular structure relating to the body. Examples of such modifiers applied to a body, include, but are not limited to, "inferior body," "superior body," "lateral body," "medial body," and the like.

The body 510 may resemble a button or plug. In one embodiment, the body 510 has a circular cross section. The body 510 may include a joint-facing articular surface 512 and a posterior surface 514. The joint-facing articular surface 512 is a part of the implant 500 that generally faces the joint. The joint-facing articular surface 512 may be convex and meet the posterior surface 514 at the edge 520. The convex shape of the joint-facing articular surface 512 may be configured to simulate or emulate the shape and contour of a natural articular surface 260 of a joint. Furthermore, the convex shape may distribute loading during use of the joint from an apex 516 of the joint-facing articular surface 512 down and out towards the edge 520.

The joint-facing articular surface 512 can have a variety of shapes and configurations. In one embodiment, the joint-facing articular surface 512 may be generally flat. In another embodiment, the joint-facing articular surface 512 may have a contour configured to facilitate articulation with a natural articular surface 270 of an adjacent bone.

In one embodiment, the posterior surface 514 is shaped to engage with a distal articular surface (e.g., natural articular surface 260) of a bone. The posterior surface 514 may be shaped to engage with the distal articular surface by way of a bone pocket formed within the distal articular surface. In one example, the bone pocket may be concave shaped and the posterior surface 514 may be convex shaped to match or substantially match the concave shape of the bone pocket. A concave bone pocket and convex posterior surface 514 can enable the body 510 to seat within the bone pocket when deployed.

The edge 520 is a structure between the joint-facing articular surface 512 and the posterior surface 514. As used herein, "edge" refers to a structure, boundary, or line where an object, surface, or area begins or ends. An edge can also refer to a boundary or perimeter between two structures, objects, or surfaces. An edge can also refer to a narrow part adjacent to a border. (search "edge" on Merriam-Webster.com. Merriam-Webster, 2021. Web. 3 Aug. 2021. Modified.) In certain embodiments, an edge can be a one dimensional or a two dimensional structure that joins two adjacent structures or surfaces. Furthermore, an edge may be at a perimeter of an object or within a perimeter or boundary of an object. In the illustrated embodiment, the edge 520 may have a circular cross-section.

In certain embodiments, the implant 500 may include a connector 530. "Connector" refers to any structure configured, engineered, designed, adapted, and/or arranged to connect one structure, component, element, or apparatus to another structure, component, element, or apparatus. A connector can be rigid, pliable, elastic, flexible, and/or semiflexible. Examples of a connector include but are not limited any fastener. As used herein, a "fastener" or "fastener system" refers to any structure configured, designed, or engineered to join two structures. Fasteners may be made of a variety of materials including metal, plastic, composite materials, metal alloys, plastic composites, and the like.

Examples of fasteners include, but are not limited to screws, rivets, bolts, nails, snaps, hook and loop, set screws, bone screws, nuts, posts, pins, thumb screws, and the like. Other examples of fasteners include, but are not limited to wires, Kirschner wires (K-wire), anchors, bone anchors, plates, bone plates, intramedullary nails or rods or pins, implants, sutures, soft sutures, soft anchors, tethers, interbody cages, fusion cages, and the like. In certain embodiments, the term fastener may refer to a fastener system that includes two or more structures configured to combine to serve as a fastener.

An example of a fastener system is a rod or shaft having external threads and an opening or bore within another structure having corresponding internal threads configured to engage the external threads of the rod or shaft. In certain embodiments, the term fastener may be used with an adjective that identifies an object or structure that the fastener may be particularly configured, designed, or engineered to engage, connect to, join, contact, or couple together with one or more other structures of the same or different types. For example, a "bone fastener" may refer to an apparatus for joining or connecting one or more bones, one or more bone portions, soft tissue and a bone or bone portion, hard tissue and a bone or bone portion, an apparatus and a bone or portion of bone, or the like.

In the illustrated embodiment, the connector 530 includes cut outs 532a,b and an opening 534. The cut outs 532a,b may facilitate aligning a coupler (e.g., a transosseous coupler 320) with a center of the implant 500. Those of skill in the art will recognize that the cut outs 532a,b may be optional and may or may not be included in an embodiment. The opening 534 may engage with the coupler to couple the implant 500 and the coupler. In the illustrated embodiment, the opening 534 extends from one cut out 532a to an opposite cut out 532b. In one embodiment, the coupler may be a tether and the connector 530 engages with the tether and secures the implant 500 to the tether. For example, one end of a tether may be passed through opening 534 and the tether may be tied into a knot to secure the tether to the implant 500.

FIG. 5E is a perspective exploded view of an implant 540 according to another embodiment of the present disclosure. FIG. 5E includes similar components, parts, devices, apparatus, features, and aspects as those disclosed and described in relation to FIGS. 5A-5D, however the difference in FIG. 5E is that the body includes a distal body 550 and a proximal body 560. The distal body 550 may include a convex distal surface similar, in certain embodiments, to the joint-facing articular surface 512 of implant 500. The proximal body 560 may include a semispherical proximal surface similar, in certain embodiments, to the posterior surface 514 of implant 500. Of course, the surfaces of the distal body 550 and proximal body 560 may be very different from those of other example embodiments included herein.

The implant 540 may also include a fastener 570 configured to couple the distal body 550 to the proximal body 560. A variety of different fasteners can be used. In the illustrated embodiment, the fastener 570 includes a shaft 572 having external threads 574 and an opening 576 having internal threads 578 that correspond to the external threads 574.

The implant 540 may be used in a variety of ways and can offer a variety of advantages for a particular use. For example, in one embodiment, the proximal body 560 and the distal body 550 may be made from different materials, each having different wear characteristics, strength, elasticity, and/or durability. In one embodiment, the proximal body 560 may be made from a metal or a metal alloy and the distal body 550 may be made from a polymer, a Synthetic polyvinyl alcohol (PVA) hydrogel, a biomaterial, a biocompatible polymer such as PolyEther Ether Ketone (PEEK) or a polylactide polymer (e.g. PLLA), and/or others. The difference in attributes between the distal body 550 and the proximal body 560 may provide advantages in terms of cost, durability, wear, and/or the like.

Figure 6:
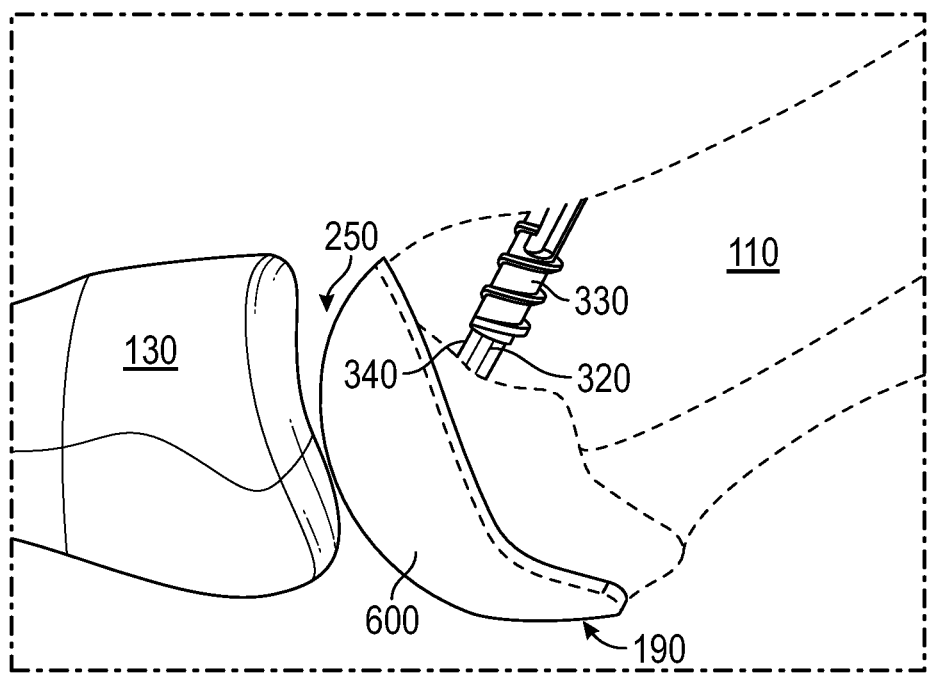
FIG. 6 is a perspective side view of a system deployed on a foot joint according to another embodiment.
Figure 7A:
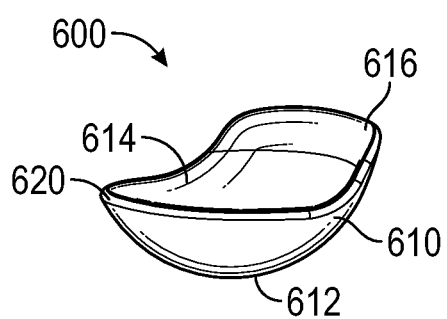
FIG. 7A is a perspective view of an implant according to another embodiment.
Figure 7B:
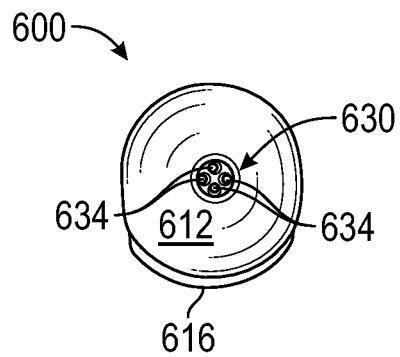
FIG. 7B is bottom view of the implant of FIG. 7A.
Figure 7C:
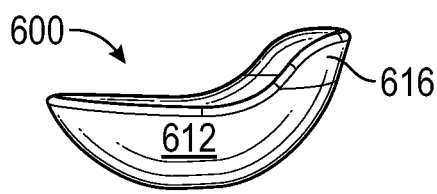
FIG. 7C is perspective side view of the implant of FIG. 7A according to one embodiment.
Figure 7D:
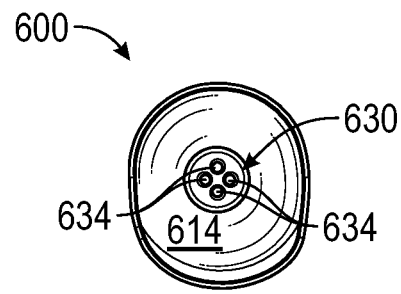
FIG. 7D is a top view of the implant of FIG. 7A.

FIG. 6 is a perspective side view of a system deployed on a foot joint according to another embodiment of the present disclosure. FIG. 6 illustrates an MTP joint 250 between a first proximal phalanx 130 and a first metatarsal 110. In one embodiment, the first metatarsal 110 may include a bone tunnel 340. FIG. 6 includes similar components, parts, devices, apparatus, features, and aspects as those disclosed and described in relation to FIG. 3, however the difference in FIG. 6 is that the system uses an alternative embodiment of the implant.

FIG. 6 illustrates an implant 600 with a different configuration from the implant 500. Patients may have a variety of conditions within the MTP joint 250 that can be addressed with embodiments of the present disclosure. In certain instances, a patient may present with an OCL that is smaller than the natural articular surface 260. In other instances, the condition of the natural articular surface 260 may be such that the whole natural articular surface 260 needs to be resurfaced. The implant 600 can be used in these instances. Generally, the implant 600 may be sized and configured to cover and/or replace a natural articular surface 260 of a bone.

FIGS. 7A-7D illustrate a perspective view, a bottom view, a perspective side view, and a top view, respectively of an implant 600 according to one embodiment. The embodiment of these figures is but one example of a variety of different implants and/or implant configurations that can be used with the present disclosure. The implant 600 may include a body 610, and edge 620, and a connector 630. The body 610 may include a joint-facing articular surface 612 and a posterior surface 614. The posterior surface 614 may contact a resurfaced version of the natural articular surface 260 and may include a coating of an osseointegration material such as hydroxyapatite (HA) or other naturally occurring and biocompatible substances configured to promote osseointegration. The coating may result in the posterior surface 614 fusing with a resurfaced articular surface of the distal end 190 of the bone (e.g., first metatarsal 110). The body 610 may be shaped such that the posterior surface 614 is concave and the joint-facing articular surface 612 is convex.

In certain embodiments, the implant 600 may include a lip 616 that extends from the body 610. The lip 616 may connect to the body 610 and include a posterior surface and joint-facing surface that each match the contour of the respective, posterior surface 614 and joint-facing articular surface 612. The lip 616 may serve to extend an articular surface of a bone such that the lip 616 serves as the articular surface of the bone when the joint is in flexion approaching approximately 90 degrees of flexion.

The connector 630 illustrates and alternative embodiment of connector 530. However, the connector 630 may serve the same purpose as the connector 530: to connect the implant 600 to a coupler such as a transosseous coupler 320, a tether, a suture, or the like. In the illustrated embodiment, the connector 630 includes a plurality of openings 634. In one embodiment, one end of a coupler can be threaded through one or more of the plurality of openings 634 to connect the coupler to the implant 600.

FIGS. 5A-5E, 6, and 7A-7D illustrate at least three different embodiments for an implant that can be used within the scope of the present disclosure. Of course, various other embodiments are contemplated and come within the scope of the present disclosure as recited in the claims. For example, other embodiments may be of different diameters, different shape posterior surfaces, different shape anterior surfaces, different form, shape, configurations of transosseous couplers, and/or different form, shape, configurations of connectors, including no connector embodiments that include a transosseous coupler formed as an integrated part of the implant. In one embodiment, the diameter of the implant may be any diameter that matches or exceeds the diameter of one or more OCLs 350 in a joint of the patient. Consequently, the size of the implant can range from a size that covers the articular surface of the distal end 190 of the bone (e.g., implant 600, also referred to as hemicap) to a button or plug size (e.g., implant 500, also referred to as a spacer).

Figure 8:
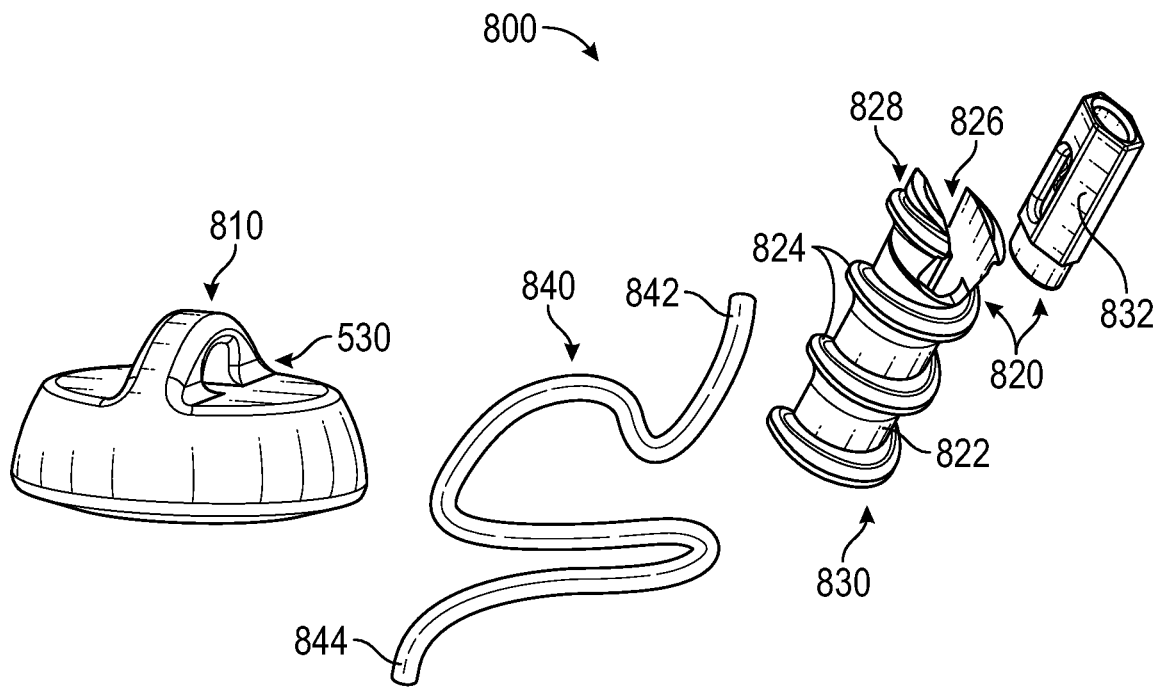
FIG. 8 is a perspective view of an arthroplasty implant system for use on a foot joint according to one embodiment.

FIG. 8 is a perspective view of an arthroplasty implant system 800 for use on a foot joint according to one embodiment. The arthroplasty implant system 800 may include an arthroplasty implant 810, a bone anchor 820, and tether 840. As used herein, an "arthroplasty procedure" refers to a surgical procedure for restoring and/or improving function and/or operation of a joint of a patient. An arthroplasty procedure can be done for a toe joint, ankle joint, knee joint, hip joint, arm joint, elbow joint, finger joint, or the like. In certain embodiments, an arthroplasty can include replacing, remodeling, resurfacing, or realigning an articular surface of a musculoskeletal joint by osteotomy or some other procedure. (Search "arthroplasty" on Wikipedia.com Jan. 14, 2022. CC-BY-SA 3.0 Modified. Accessed Jan. 14, 2022.) An arthroplasty procedure may be an elective procedure to relieve pain and/or restore function to a joint after damage by arthritis or some type of trauma. An "arthroplasty implant" is an implant used in an arthroplasty procedure.

Figure 9:
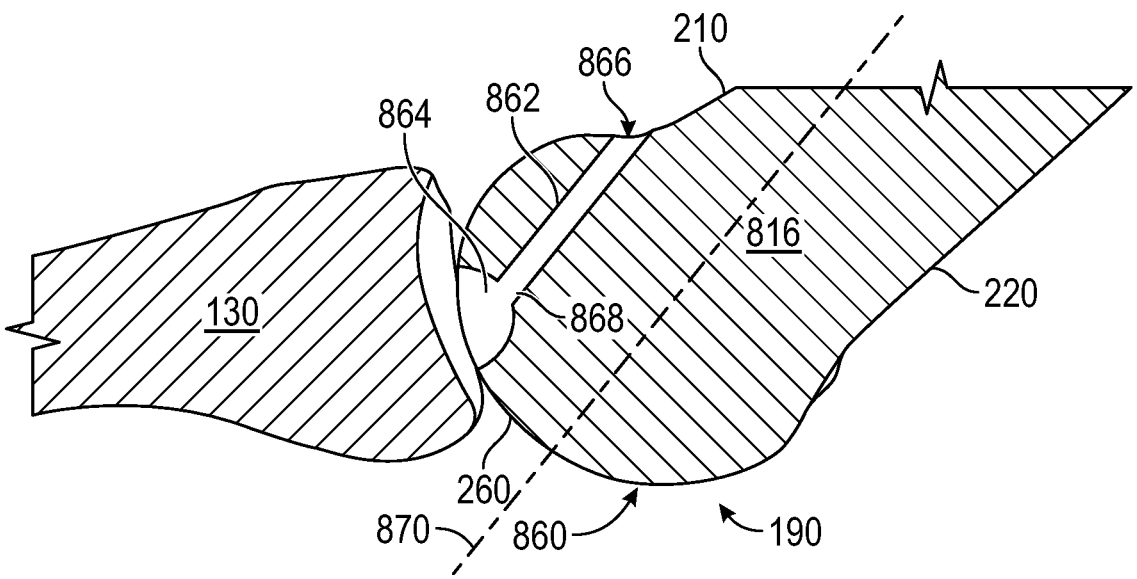
FIG. 9 is a cross-section view of a distal end of a metatarsal bone according to one apparatus, system, and/or method of one embodiment of the present disclosure.

The arthroplasty implant 810 is an implant configured to engage a distal articular surface 860 of a metatarsal bone 816 (See for example FIG. 9). In certain embodiments, the arthroplasty implant 810 may be similar to and/or may function similar to the implant 500 described in herein. Alternatively, or in addition, the arthroplasty implant 810 may include distinct differences from the implant 500. In the illustrated embodiment, the arthroplasty implant 810 includes a connector 530 like the connected in the implant 500.

The bone anchor 820 may be a single unitary piece such as the example embodiment bone anchor 330 described in relation to FIG. 2. Or, as in the illustrated embodiment, the bone anchor 820 may include two or more pieces. In the illustrated embodiment, the bone anchor 820 includes a body 822 having external threads 824 on an outside surface of the body 822. The external threads 824 can be configured to engage with bone. In one embodiment, the external threads 824 may engage with an internal surface (e.g., walls) of a bone tunnel. In certain embodiments, the bone anchor 820 may be secured to the metatarsal bone 816 away from the distal articular surface 860. For example, the bone anchor 820 may be secured within, onto, near, or around the dorsal surface 210, the plantar surface 220, the medial surface 230, and/or the lateral surface 240.

In one embodiment, the bone anchor 820 may sit within a bone tunnel of a bone of the patient. The bone anchor 820 may sit within a proximal opening of the bone tunnel. In one embodiment, the body 822 is a cylindrical body that includes a passage or opening 826 that extends from a proximal end 828 to a distal end 830.

The bone anchor 820 may also include a tether locking feature 832. As used herein, a "lock" or "lock mechanism" refers to an object, member, structure, component, part, apparatus, system, or assembly that either alone or in combination with other parts or components prevents, limits, impedes, is in a fixed relationship to, stops, or restricts motion or movement and/or operation of the another object, member, structure, component, part, apparatus, system, or assembly.

In one embodiment, the tether locking feature 832 is configured to implement line-lock device, either independently, or together with the body 822. A line-lock device is a technology and/or apparatus that permits a suture, line, and/or tether to slide past the line-lock device in one direction, but the suture, line, and/or tether is impeded or restricted or locked from sliding past the line-lock device in another direction. To use the line-lock device, one end of a suture, line, and/or tether, such as tether 840 can be threaded through the line-lock device in one direction and as the tether 840 moves through the line-lock device the tether 840 is prevented from moving out of the line-lock device in the opposite direction. In this manner, a user can tighten the tether 840 using the tether locking feature 832 and/or body 822 and the tether 840 remains tight and/or taut.

The opening 826 may be configured to receive the tether locking feature 832 within the opening 826 and retain the tether locking feature 832 within the opening 826. In one embodiment, the tether locking feature 832 and/or the opening 826 may be configured to engage with each other such that the tether locking feature 832 can sit within the opening 826 of a cylindrical body 822. For example, the tether locking feature 832 and opening 826 may each have a polygon cross section sized for a slip fit between the tether locking feature 832 and the opening 826. In certain embodiments, the tether locking feature 832 and opening 826 of the body 822 may cooperate to implement a line-lock device. Alternatively, or in addition, the tether locking feature 832 alone may implement the line-lock device. The tether locking feature 832 is configured to couple a proximal end of the tether 840 to the bone anchor 820.

The tether 840 is configured to couple the arthroplasty implant 810 to the bone anchor 820. In certain embodiments, the tether 840 may couple the arthroplasty implant 810 to a bone. The term "tether" is used herein to mean any strand or flexible member, natural or synthetic, able to join or connect or couple two structures. In one embodiment, a tether can join tissue of a patient and/or to be anchored in a bone tunnel or to hard tissue and useful in a surgical procedure. A tether may join two structures either directly by connecting directly to one structure or directly to the other or indirectly by connecting indirectly (by way of one or more intermediary structures) to one structure, to the other structure, or to both structures. In certain embodiments, "tether" refers to a flexible line or flexible member of natural material, natural biological material, biomaterial, biomimetic materials, man-made material, or a combination of these either in a single tether, a composite tether, or a plurality of tissue tethers that extend in parallel and/or may be woven or bonded together. In certain embodiments, a tether may be long and thin. In certain embodiments, a tether may be planar and/or may be elastic or inelastic (rigid). Examples of a tether include, but are not limited to, a thread, a string, a polymer thread or line, a suture, suture tape, a woven tether, a fibrous material, a cord, and/or any of these in combination with each other, and the like.

The tether 840 includes a proximal end 842 and a distal end 844. In one embodiment, the proximal end 842 can be connected, coupled, joined, tied, or otherwise engaged with the bone anchor 820 and/or bone of a patient. The distal end 844 can be connected, coupled, joined, tied, or otherwise engaged with the arthroplasty implant 810. In one embodiment, the distal end 844 may be tied to the connector 530 by passing the distal end 844 through the opening 534 and tying a knot near the distal end 844. In another embodiment, the distal end 844 may be passed through the connector 530 (e.g., through the opening 534 and positioned near the proximal end 842 such that a loop engages the connector 530. In such an embodiment, the proximal end 842 and distal end 844 may both be connected, coupled, joined, tied, or otherwise engaged with the bone anchor 820. In certain embodiments, the tether 840 is flexible and can be stretched when tension is applied to tether 840, for example, to the proximal end 842 and distal end 844 of the tether 840.

FIG. 9 is a cross-section view of a distal end 190 of a metatarsal bone 816 according to one apparatus, system, and/or method of one embodiment of the present disclosure. FIG. 9 illustrates the metatarsal bone 816 and the first proximal phalanx 130 before components of the apparatus, system, or assembly of the present disclosure are deployed.

The metatarsal bone 816 includes a bone tunnel 862 and a bone pocket 864. The bone tunnel 862 may be similar to the bone tunnel 340 described herein. In one embodiment, the bone tunnel 862 is cylindrical. The bone tunnel 862 may include a proximal end 866 (also referred to as a proximal opening) and a distal end 868. In one embodiment, the proximal end 866 exits between a distal end 190 and a proximal end 180 of a bone. In the illustrated embodiment, the proximal end 866 may exit near a dorsal surface 210 of a metatarsal bone 816. In certain embodiments, the distal end 868 may exit directly at, or onto, a distal articular surface 860 (e.g., a natural articular surface 260) of the metatarsal bone 816. In another embodiment, the distal end 868 may exit indirectly at, or onto, a distal articular surface 860 (e.g., a natural articular surface 260) by way of a bone pocket 864 formed in the distal articular surface 860 (e.g., a natural articular surface 260) of the metatarsal bone 816. The distal end 868 may exit within the bone pocket 864. The bone tunnel 862 may be formed using a surgical drill and drill bit. The length and diameter of the bone tunnel 862 can vary and may be similar to that of the bone tunnel 340.

A bone pocket 864 is a type of opening or recess. A bone pocket 864 may be defined as a recess having a larger diameter than a bone tunnel 862. The bone pocket 864 may extend proximally from the natural articular surface 260 into the bone.

In one embodiment, the bone tunnel 862 is cylindrical and the bone pocket 864 is semispherical, half spherical, circular, or the like. In one embodiment, the bone pocket 864 may be cylindrical. The bone pocket 864 may be formed in the natural articular surface 260/distal articular surface 860 using a surgical reamer with a semispherical bit. The size and shape of the bone pocket 864 can vary based on similar characteristics to those for the bone tunnel 862. The bone pocket 864 can have a diameter (e.g., a maximum diameter) that is slightly larger than the diameter of an implant 500 or arthroplasty implant 810. A spherical bone tunnel 862 may not have a minimum diameter.

The bone tunnel 862 may extend from the bone pocket 864 at an angle. The length of the bone tunnel 862 and/or angle of the bone tunnel 862 within the bone pocket 864 may depend on a variety of factors including but not limited to, the size and location of the OCL 350, the desired exit point for the proximal end 866 of the bone tunnel 862, the size and depth of the bone pocket 864, characteristics of the patient, and the like. The angle for the bone tunnel 862 may be measured relative to a long axis 870 of the metatarsal bone 816. The angle may range from about negative 85 degrees and about positive 85 degrees.

In certain embodiments, FIG. 9 illustrates the bones of a joint after preparatory steps in a system, and/or method of one embodiment of the present disclosure. At the phase illustrated the metatarsal bone 816 includes a bone tunnel 862 and bone pocket 864, each sized, positioned, and/or configured for deployment of members of the arthroplasty implant system 800, as one example.

Figure 10:
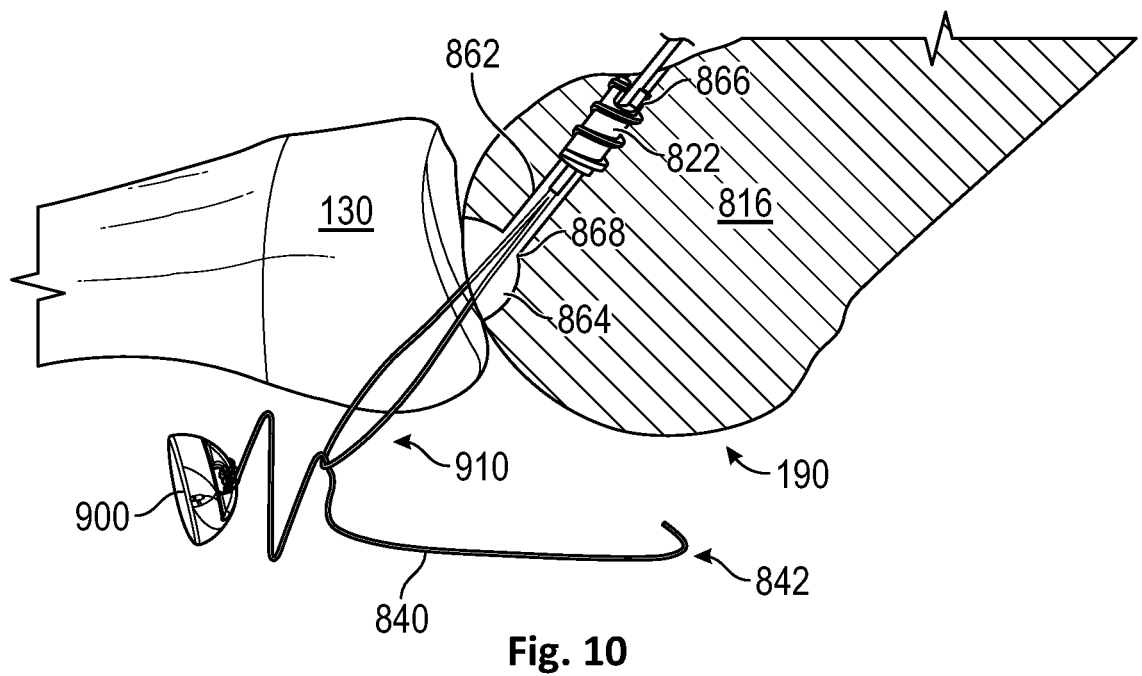
FIG. 10 is a cross-section view of a distal end of a metatarsal bone according to one apparatus, system, and/or method of one embodiment of the present disclosure.

FIG. 10 is a cross-section view of a distal end 190 of a metatarsal bone 816 according to one apparatus, system, and/or method of one embodiment of the present disclosure. FIG. 10 illustrates a step in a method, process, or procedure of one embodiment of the present disclosure following preparatory step(s) illustrated in relation to FIG. 9. FIG. 10 illustrates a body 822 of a bone anchor 820 deployed within a proximal end 866 of the bone tunnel 862.

FIG. 10 also illustrates an articular implant 900. An articular implant 900 is an implant configured for use on at least part of an articular surface such as the distal articular surface 860 of the metatarsal bone 816. In the illustrated embodiment, the articular implant 900 may be configured similar to the arthroplasty implant 810. A distal end 844 of the tether 840 may be coupled, connected, or tied to the articular implant 900 (e.g., by way of a first connector such as connector 530, the first connector may be an opening in the articular implant 900). The proximal end 842 of the tether 840 may be free.

A surgeon may pass a suture threader 910 through the bone tunnel 862 from the proximal end 866 to the distal end 868 and bone pocket 864. The surgeon may thread the proximal end 842 through a loop in the suture threader 910. Next, the surgeon may pull the suture threader 910 out of the bone tunnel 862 from the proximal end 866 and thereby pass the proximal end 842 of the tether 840 through the bone tunnel 862.

Figure 11:
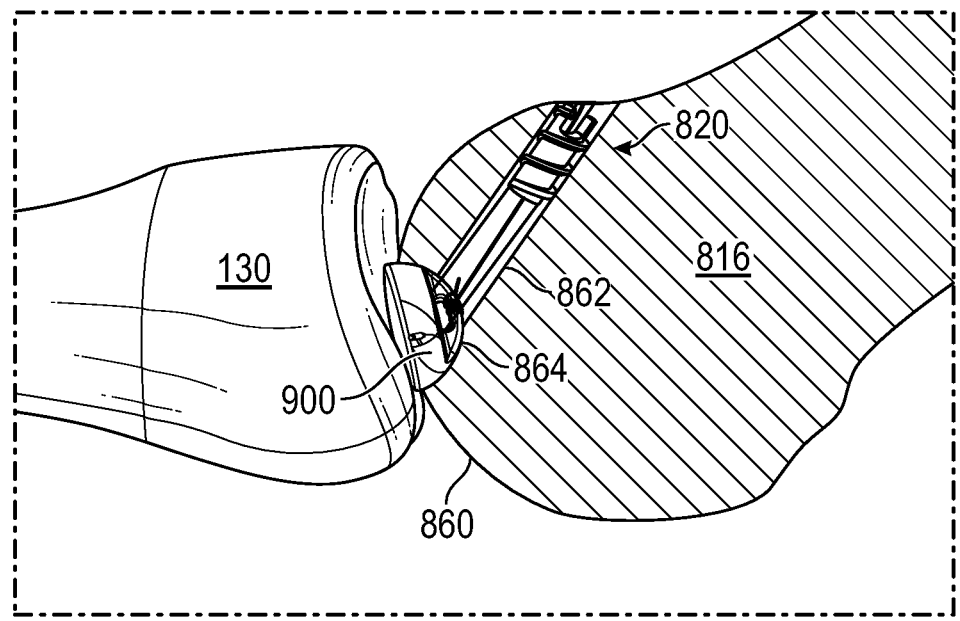
FIG. 11 is a cross-section view of a distal end of a metatarsal bone according to one apparatus, system, and/or method of one embodiment of the present disclosure.

FIG. 11 illustrates a result of a subsequent set of steps in the method or procedure in accordance with one embodiment of the present disclosure after steps described in relation to FIG. 10. FIG. 11 illustrates that the surgeon has pulled the tether 840 through the bone tunnel 862 until the articular implant 900 is embedded into the bone pocket 864 of a distal articular surface 860 of the metatarsal bone 816 (e.g., a natural articular surface 260).

In addition, the surgeon has coupled the tether 840 to the bone anchor 820 such that the bone pocket 864 retains the articular implant 900 in place during osseointegration of the articular implant 900 into the metatarsal bone 816. In one embodiment, the surgeon may couple the tether 840 to the bone anchor 820 by engaging a tether locking feature 832 with the proximal end 842 of the tether 840. The tether locking feature 832 may serve as a second connector coupled to the bone anchor 820. In certain embodiments, the proximal end 842 may pass through the tether locking feature 832 and thereby tighten the tether 840. The tether locking feature 832 may then be positioned within the body 822 of the bone anchor 820.

Together the articular implant 900, tether 840, and bone anchor 820 cooperate to replace at least a portion of the distal articular surface 860 (e.g., a natural articular surface 260). The articular implant 900 can serve as a spacer within a joint (e.g., an MTP joint 250). "Spacer" refers to a mechanical device, apparatus, member, object, body, component, or structure, that is organized, configured, designed, arranged, or engineered to maintain a separation between two adjacent objects, surfaces, or structures. The articular implant 900 maintains separation between the distal articular surface 860 and the articular surface of an adjacent phalanx bone (e.g., first proximal phalanx 130).

Advantageously, certain embodiments of the present disclosure provide fixation of the articular implant 900 within the joint as the bones and joint heal from a procedure. In certain embodiments, the fixation is temporary and/or adjunctive (or supplemental) to a permanent fixation as the bone fuses with the articular implant 900 as part of the healing process.

In certain embodiments, the articular implant 900 (e.g., its edge 520 and/or posterior surface 514) and the surface of the bone pocket 864 may be configured to cooperate to provide fixation through a press-fit connection/interface between the bone pocket 864 and the articular implant 900. Alternatively, or in addition, the articular implant 900 (e.g., its edge 520 and/or posterior surface 514) and the surface of the bone pocket 864 may be configured to cooperate to provide fixation through a slip-fit connection/interface between the bone pocket 864 and the articular implant 900. The slip-fit connection/interface may result from embedding the articular implant 900 in the distal articular surface 860. The slip-fit connection/interface together with intrinsic compression from the joint reactive force when a surgeon reduces the MTP joint can serve to maintain the position of the articular implant 900 on the distal articular surface 860.

Alternatively, or in addition, the tether 840 coupling the articular implant 900 to the bone anchor 820 may provide positive fixation with a constant tension that keeps the articular implant 900 in the bone pocket 864 and in position on the distal articular surface 860. The bone anchor 820 secures a proximal end 842 of the tether 840 to the metatarsal bone 816 away from the bone pocket 864.

This positive fixation from the tether 840 and bone anchor 820 can serve as adjunctive fixation once the procedure is complete. This adjunctive fixation may enable the patient to begin using the joint very soon after the procedure and can reduce the recovery time. As the patient heals, each of the members of the arthroplasty implant system 800 can be fused and/or integrated with the bone of the patient to provide permanent fixation. In certain embodiments, components of the arthroplasty implant system 800 may be made from bioabsorbable or resorbable materials, such that they may be partially or completely absorbed by the body of the patient. The adjunctive fixation can last beyond the life of the patient or may last long enough for the bone to heal and close the bone tunnel 862 and/or the bone pocket 864.

In one embodiment, one or more surfaces of the articular implant 900, tether 840, and/or bone anchor 820 may be coated with a coating of an osseointegration material such as hydroxyapatite (HA) or other naturally occurring and/or biocompatible substances configured to promote osseointegration. "Osseointegration" refers to the direct structural and functional connection between living bone and the surface of an implant. Said another way, osseointegration is functional ankylosis (bone adherence), where new bone is laid down directly on an implant surface and the implant exhibits mechanical stability (i.e., resistance to destabilization by mechanical agitation or shear forces). Osseointegration is the formation of a direct interface between an implant and bone, without intervening soft tissue. (Search "osseointegration" on Wikipedia.com Sep. 15, 2021. Quoting other sources. CC-BY-SA 3.0 Modified. Accessed Jan. 21, 2022.)

In one embodiment, the tether 840 can be made from a bioabsorbable material such that the tether 840 may be partially, or completely, absorbed into the bone of a patient over time. Alternatively, or in addition, the articular implant 900 and bone anchor 820 may be partially or wholly osseointegrated into the bone. In this manner, the arthroplasty implant system 800 may become a permanent part of the joint and/or bone.

Figure 12:
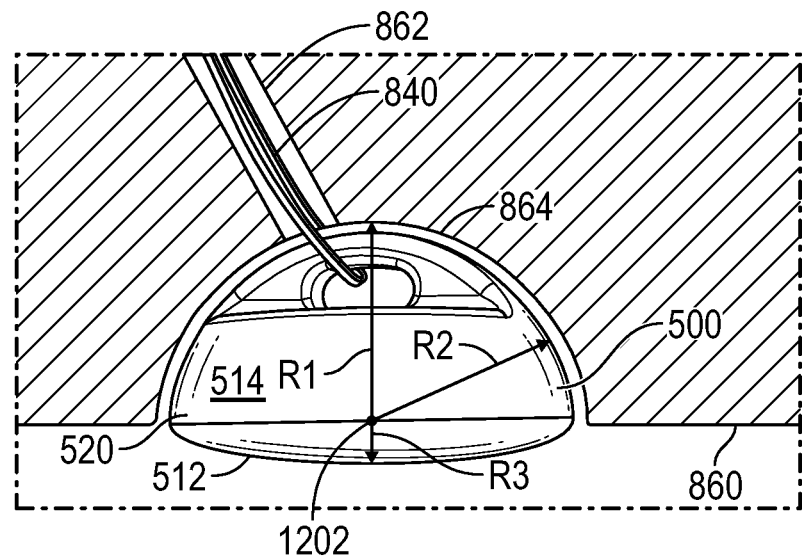
FIG. 12 is a cross-section view of an implant according to one embodiment.

FIG. 12 is a cross-section view of an implant according to one embodiment. FIG. 12 illustrates an example implant 500 positioned within a bone pocket 864. In the illustrated embodiment, the bone pocket 864 has a semispherical or hemispherical shape and has a bone radius measured from point 1202 with a constant radius R1. In one embodiment, R1 may be between about 1.5 mm and about 3 mm, and may depend on the size of the implant 500 being used. For example, in one embodiment, the size of R2 is substantially the same as the size of R1. R1 and/or R2 may be sized to be substantially half of the diameter of an OCL 350 that was present on the distal articular surface 860 before the bone pocket 864 was formed. In certain embodiments, the size of R1 and/or R2 may be slightly larger than half of the diameter of an OCL 350 that was present on the distal articular surface 860 before the bone pocket 864 was formed.

FIG. 12 illustrates that the posterior surface 514 is convex and the edge 520 is circular. The posterior surface 514 may be semispherical and the bone pocket 864 may be semispherical. In one embodiment, the posterior surface 514 may have a hemispherical shape with a constant radius R2 from point 1202. In one embodiment, R2 may be substantially the same as R1. R2 and R1 being the same can ensure an even and constant interface between the posterior surface 514 and a surface of the bone pocket 864. This interface retains the implant 500 within the bone pocket 864.

In certain embodiments, R2 is greater than R1. R2 greater than R1 may ensure that the joint-facing articular surface 512 will extend outside the bone pocket 864 making the joint-facing articular surface 512 prominent to the distal articular surface 860. This enables the joint-facing articular surface 512 to serve as an articulation surface.

FIG. 12 also illustrates an articular implant 500 having a joint-facing articular surface 512 that is convex. The joint-facing articular surface 512 may have a radius R3 measured from point 1202 that defines convex joint-facing articular surface 512. R3 and R2 may be sized such that the joint-facing articular surface 512 is prominent and serves as a suitable replacement for at least a portion of the distal articular surface 860. In one embodiment, the joint-facing articular surface 512 extends above the distal articular surface 860 by between about 1 mm to about 1.5 mm.

FIG. 12 illustrates a tether 840 that couples the implant 500 to a bone anchor 820 (See FIG. 11) through a bone tunnel 862 that extends from the bone pocket 864 such that when the tether 840 couples the implant 500 to the bone anchor 820 at least a portion of the edge 520 contacts a surface of the bone pocket 864 below the distal articular surface 860. The angle and trajectory of the bone tunnel 862 relative to the bone pocket 864 can be selected to maximize the fixation affect between the posterior surface 514, edge 520, and the surface of the bone pocket 864. The angle of the bone tunnel 862 may apply an even tension on the implant 500 pressing the posterior surface 514 against the surface of the bone pocket 864.

Figure 13:
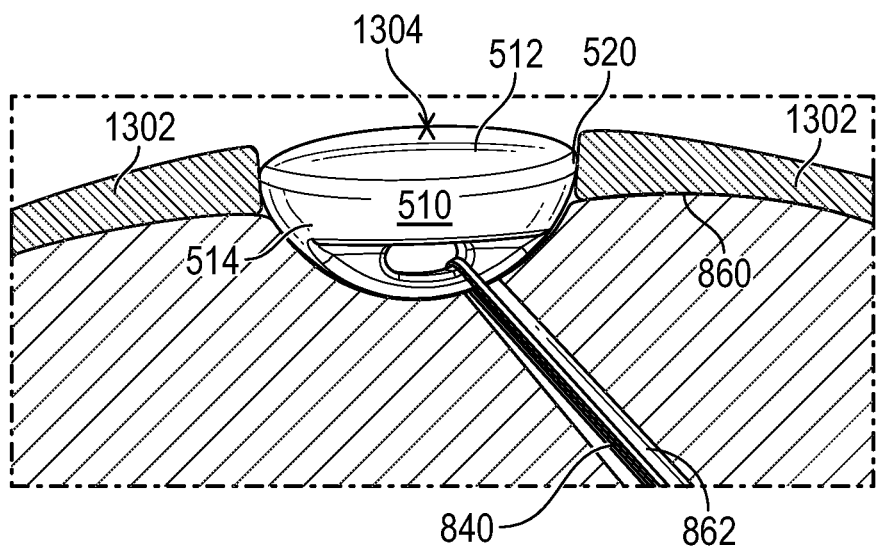
FIG. 13 is a cross-section view of an implant according to one embodiment.

FIG. 13 is a cross-section view of an implant according to one embodiment. FIG. 13 illustrates an implant 500 with a body 510 having the joint-facing articular surface 512, a convex posterior surface 514, and an edge 520 between the joint-facing articular surface 512 and the convex posterior surface 514. In certain embodiments, it may be desirable to have the edge 520 be prominent to the distal articular surface 860. Said another way, the implant 500 and bone pocket 864 may be sized such that the edge 520 extends above the natural articular surface 260 of the bone. Furthermore, it may be desirable to have the edge 520 be prominent to (i.e., extend above) the distal articular surface 860 and below a surface of cartilage 1302. In this manner, the edge 520 is contained within the cartilage 1302.

FIG. 13 also illustrates that in the example embodiment, the implant 500 includes a joint-facing articular surface 512 that is convex and has a size and shape such that a top (marked by X 1304) of the joint-facing articular surface 512 is congruent with or substantially congruent with cartilage 1302 and/or a surface of the cartilage 1302. The top 1304 may be a geometric center of the joint-facing articular surface 512. In another embodiment, the joint-facing articular surface 512 has a size and shape such that the top 1304 is below a surface of surrounding cartilage 1302 of the distal articular surface 860 and the edge 520 is below surface of surrounding cartilage 1302.

Figure 14:
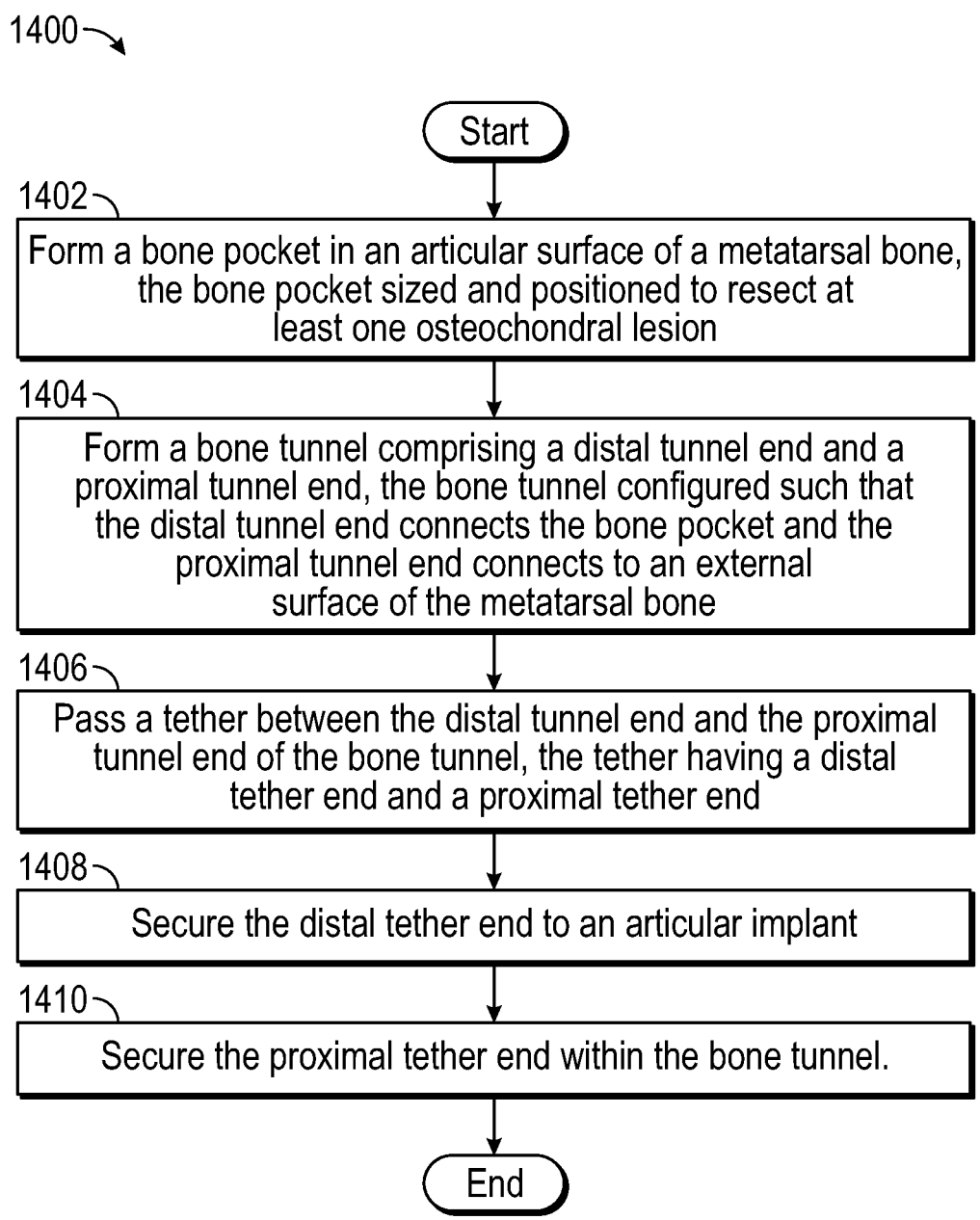
FIG. 14 is a flow chart diagram of one example method for deploying an arthroplasty implant system according to one embodiment.
Figure 15A:
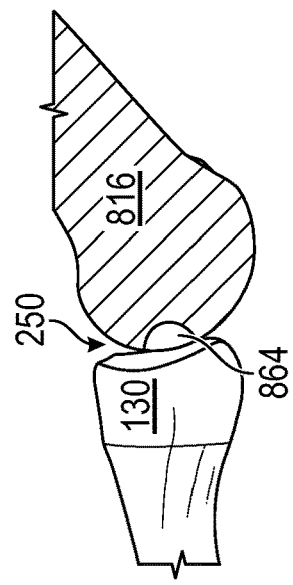
FIGS. 15A-15F illustrate perspective cross-section views of different steps in an example method for deploying an arthroplasty implant system according to one embodiment.

FIG. 14 is a flow chart diagram of one example method 1400 for deploying an arthroplasty implant system according to one embodiment. FIGS. 15A-15F illustrate perspective cross-section views of different steps in an example method, such as method 1400 for deploying an arthroplasty implant system according to one embodiment. Referring to FIGS. 8 through 15F, the method 1400 starts with a user, such as a surgeon, forming 1402 a bone pocket 864 in an articular surface of a metatarsal bone (e.g., distal articular surface 860 of metatarsal bone 816), the bone pocket 864 is sized and positioned to resect at least one OCL 350. A surgeon may distract the joint in order to provide access for forming the bone pocket 864. In certain embodiments, the surgeon may start with a small bone pocket 864 and progressively increase the size of the bone pocket 864 until a sufficient amount of OCL 350 is removed. FIG. 15A illustrates one example after completion of the forming step 1402.

Figure 15B:
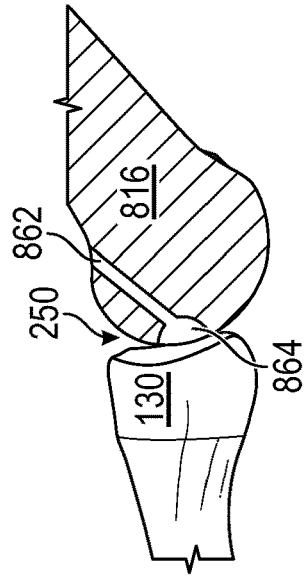

Next, a surgeon, or other user, may form 1404 a bone tunnel 862 comprising a distal tunnel end (e.g., distal end 868) and a proximal tunnel end (e.g., proximal end 866), the bone tunnel 862 is configured such that the distal tunnel end connects the bone pocket 864 and the proximal tunnel end connects to an external surface of the metatarsal bone 816. The position, length and trajectory of the bone tunnel 862 may vary based on a variety of factors and may be determined, at least in part, using a guide that may seat, index, or register on the bone pocket 864. FIG. 15B illustrates one example after completion of the forming step 1404.

Next, a surgeon, or other user, may pass 1406 a tether 840 through the distal tunnel end (e.g., distal end 868) and proximal tunnel end (e.g., proximal end 866) of the bone tunnel 862. In one embodiment, the surgeon may use a suture threader to pass the tether 840 from the distal tunnel end (e.g., distal end 868) and proximal tunnel end (e.g., proximal end 866) by pulling the tether 840. The tether 840 may include a distal tether end and a proximal tether end. Of course, there are a variety of ways a surgeon may pass 1406 the tether 840 through the bone tunnel 862 each of which is within the scope of the present disclosure. For example, the tether 840 may be pushed from the distal tunnel end to the proximal tunnel end.

Figure 15C:
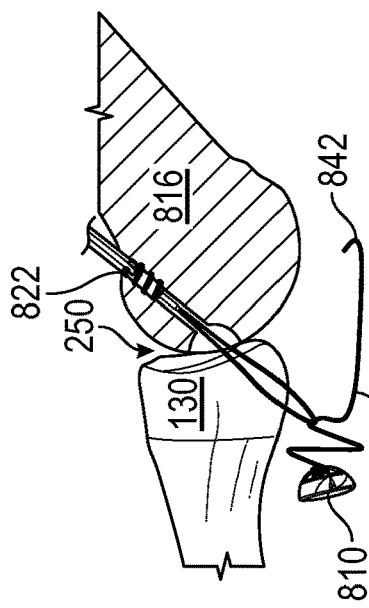
Figure 15D:
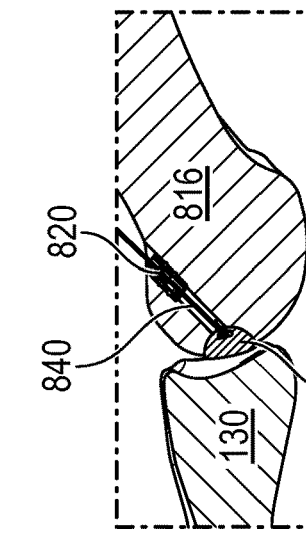

FIG. 15C illustrates one example as a surgeon is passing 1406 the tether 840 through the bone tunnel 862. The surgeon has inserted a suture threader through the bone tunnel 862. The proximal end 842 of the tether 840 has been passed through a loop in the suture threader such that withdrawing the suture threader from the bone tunnel 862 will pull the tether 840 through the bone tunnel 862, as illustrated in FIG. 15D.

In one embodiment in a next step in the method 1400, a user may secure 1408 the distal tether end (e.g., distal end 844) to the arthroplasty implant 810. FIG. 15C illustrates that this step 1408 has been completed. Those of skill in the art will appreciate that step 1408 can be performed at various times and in a different order than the one described here. A user may secure 1408 the distal tether end to the arthroplasty implant 810 before a surgical procedure begins. Alternatively, a manufacturer may secure 1408 the distal tether end to the arthroplasty implant 810.

FIG. 15C also illustrates that the body 822 may be deployed within the bone tunnel 862. Those of skill in the art will appreciate that deployment of a bone anchor 820 or part of a bone anchor 820 may be performed at different times in the method 1400. In the illustrated embodiment, the body 822 may be configured to receive the tether locking feature 832.

Figure 15E:
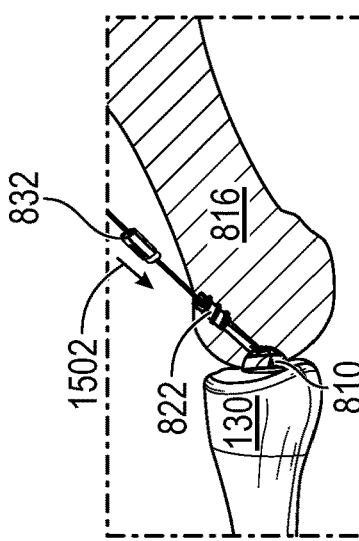

In one embodiment in a next step in the method 1400, a user may secure 1410 the proximal tether end within the bone tunnel 862. In one embodiment, the user may couple the distal end 844 of the tether 840 to a tether locking feature 832 and hold the tether 840 tight while moving the tether locking feature 832 along the tether 840 in the direction of arrow 1502. This action may tighten the tether 840 and introduce tension between the arthroplasty implant 810 and the bone anchor 820 (body 822 and tether locking feature 832). The user may then seat the tether locking feature 832 in the body 822 to secure 1410 the tether 840 to the metatarsal bone 816. One example of step 1410 is shown in FIG. 15E.

Figure 15F:
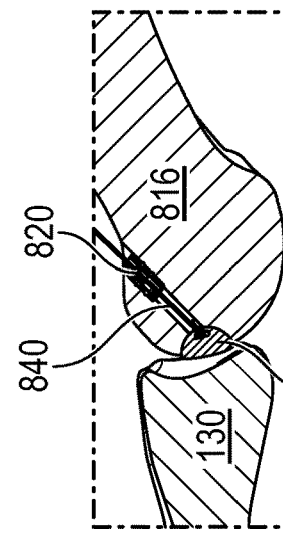
Figure 16A:
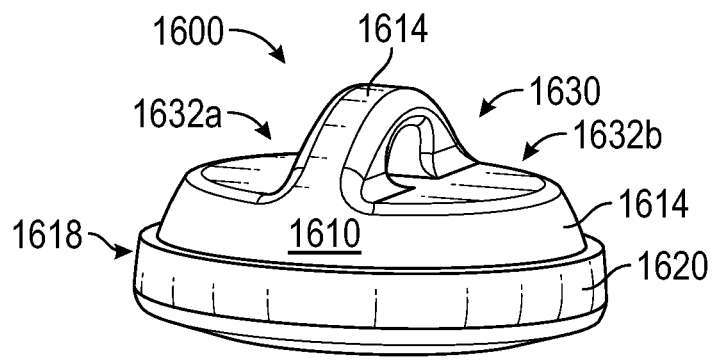
FIG. 16A is a perspective view of an implant according to one embodiment.
Figure 16B:
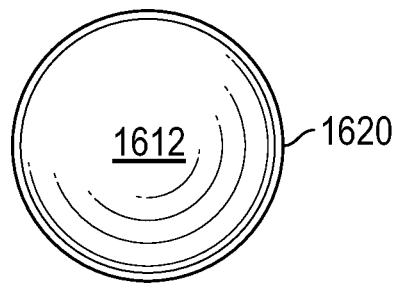
FIG. 16B is bottom view of the implant of FIG. 16A according to one embodiment.
Figure 16C:
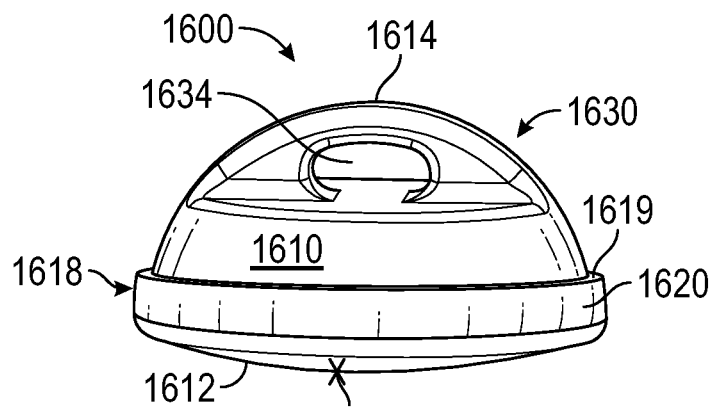
FIG. 16C is perspective side view of the implant of FIG. 16A according to one embodiment.
Figure 16D:
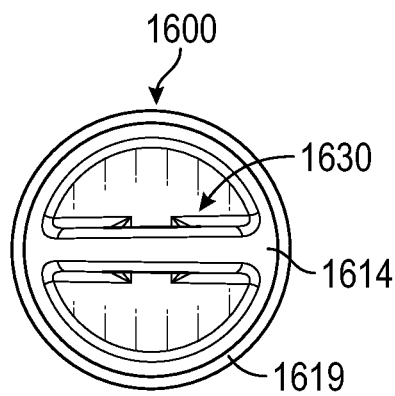
FIG. 16D is a top view of the implant of FIG. 16A according to one embodiment.

Step 1410 may complete the method 1400. FIG. 15F illustrates one example of the arthroplasty implant system 800 successfully deployed in the metatarsal bone 816.

In certain embodiments, after a successful deployment of arthroplasty implant system 800, a user may desire a revision procedure. For example, the arthroplasty implant system 800 may have performed without any problems, however the condition of the MTP joint 250 may have deteriorated. "Revision procedure" refers to a surgical procedure in which the procedure's purpose is to change an aspect of a prior surgical procedure. A revision procedure may be performed to address infection, disease, a complication, or for a variety of other reasons.

In one embodiment, cartilage 1302 around the arthroplasty implant 810 may have developed one or more OCLs 350. During such a revision procedure a surgeon can ream the arthroplasty implant 810 out of the bone pocket 864 and/or resize the bone pocket 864 to a size that supports a second arthroplasty implant that has a greater diameter than the arthroplasty implant 810. The surgeon may restore the bone tunnel 862, for example, by using a surgical drill and bit. Next, the surgeon may pass a second tether through the restored bone tunnel, secure a distal tether end of the second tether to the second arthroplasty implant, and secure a proximal tether end of the second tether within the restored bone tunnel as part of the revision procedure.

FIGS. 16A-16D is a perspective view, bottom view, perspective side view, and top view, respectively of an implant 1600 according to one embodiment. The embodiment of these figures is but one example of a variety of different implants and/or implant configurations that can be used with the present disclosure.

The body 1610 may resemble a button or plug. In one embodiment, the body 1610 has a circular cross section. The body 1610 may include a joint-facing articular surface 1612 and a posterior surface 1614. The joint-facing articular surface 1612 may be a part of the implant 1600 that generally faces the joint. The joint-facing articular surface 1612 may be convex and meet the posterior surface 1614 at a shoulder 1618. The convex shape of the joint-facing articular surface 1612 may be configured to simulate or emulate the shape and contour of a natural articular surface of a joint. Furthermore, the convex shape may distribute loading during use of the joint from an apex 1616 of the joint-facing articular surface 1612 down and out towards the shoulder 1618.

The joint-facing articular surface 1612 can have a variety of shapes and configurations. In one embodiment, the joint-facing articular surface 1612 may be generally flat. In another embodiment, the joint-facing articular surface 1612 may have a contour configured to facilitate articulation with a natural articular surface of an adjacent bone.

In one embodiment, the posterior surface 1614 is shaped to engage with a distal articular surface (e.g., natural articular surface 260) of a bone. In one embodiment, a posterior surface 1614 may be configured to seat within a bone pocket 864 (see FIG. 17).

The posterior surface 1614 may be shaped to engage with the distal articular surface by way of a bone pocket formed in the distal articular surface. In one example, the bone pocket may be concave shaped and the posterior surface 1614 may be convex shaped to match or substantially match the concave shape of the bone pocket. A concave bone pocket and convex posterior surface 1614 can enable the body 1610 to seat within the bone pocket when deployed.

In one embodiment, the posterior surface 1614 may engage a surface of a bone pocket and a shoulder 1618 may engage a surface of a natural articular surface of the bone that includes the bone pocket.

In one embodiment, the shoulder 1618 is a structure between the joint-facing articular surface 1512 and the posterior surface 1614. The shoulder 1618 can serve to prevent or mitigate movement of the implant 1600 further into the bone pocket or other features of the bone once deployed. Forces acting to move the implant 1600 into the bone, bone features, and/or the bone pocket include but are not limited to pressure against the joint-facing articular surface 1512 during movement of the joint and tension from a tether or other coupler that connects the implant 1600 to a bone anchor.

In certain embodiments, a shoulder may be a type of a two dimensional edge that joins two adjacent structures or surfaces. In certain embodiments, the shoulder 1618 may be at a perimeter of the implant 1600. In one embodiment, the shoulder 1618 circumscribes the body 1610. In the illustrated embodiment, the implant 1600 may include a single shoulder 1618 that may have a circular cross-section. Those of skill in the art will appreciate that the implant 1600 can include one or more shoulders 1618 and/or a single shoulder 1618 can include one or more cutouts around its perimeter.

In the illustrated embodiment, the shoulder 1618 includes a contact surface 1619 and an edge 1620. The contact surface 1619 may be configured to directly contact a surface of the natural articular surface (e.g., surface 860 in FIG. 17) of the bone when the implant 1600 is positioned within a bone socket 864 and/or secured to a bone anchor, for example by way of a bone tunnel 862. The edge 1620 may be planar or come to a point around the shoulder 1618. A pointed edge 1620 may be advantageous in positioning the edge 120 between cartilage of the natural articular surface and the natural articular surface.

In certain embodiments, the implant 1600 may include a connector 1630. In the illustrated embodiment, the connector 1630 includes cut outs 1632a,b and an opening 1634. The cut outs 1632a,b may facilitate aligning a coupler (e.g., a transosseous coupler 320) with a center of the implant 1600. Those of skill in the art will recognize that the cut outs 1632a,b may be optional and may or may not be included in an embodiment. The opening 1634 may engage with the coupler to couple the implant 1600 and the coupler. In the illustrated embodiment, the opening 1634 extends from one cut out 1632a to an opposite cut out 1632b. In one embodiment, the coupler may be a tether and the connector 1630 engages with the tether and secures the implant 1600 to the tether. For example, one end of a tether may be passed through opening 1634 and the tether may be tied into a knot to secure the tether to the implant 1600.

Figure 17:
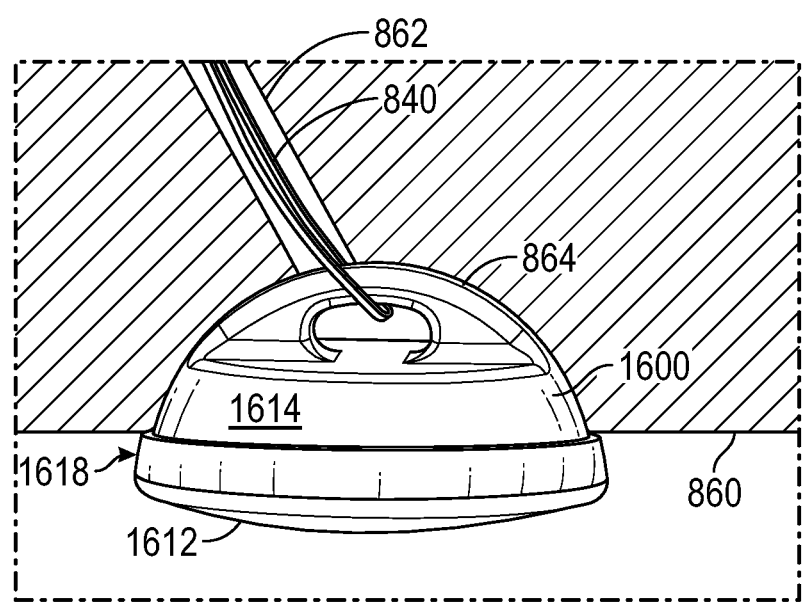
FIG. 17 is a cross-section view of an implant according to one embodiment.

FIG. 17 is a cross-section view of an implant according to one embodiment. FIG. 17 illustrates an example implant 1600 positioned within a bone pocket 864. In the illustrated embodiment, the bone pocket 864 has a semispherical or hemispherical shape. FIG. 17 illustrates a convex joint-facing articular surface 1612, a convex posterior surface 1614, and a shoulder 1618 that circumscribes the body 1610.

FIG. 17 illustrates a tether 840 that couples the implant 1600 to a bone anchor 820 (See FIG. 11) through a bone tunnel 862 that extends from the bone pocket 864. The angle and trajectory of the bone tunnel 862 relative to the bone pocket 864 can be selected to maximize the fixation affect between the posterior surface 1614, shoulder 1618, and the surface 860 of the bone. The angle of the bone tunnel 862 together with the tether may apply an even tension on the implant 1600 pressing the posterior surface 1614 against the surface of the bone pocket 864 and the contact surface 1619 of the shoulder 1618 against the natural articular surface 860.

Advantageously, a shoulder 1618 can serve to prevent the implant 1600 from subsiding deeper into the cortex of the natural articular surface and/or bone. For example, in certain instances, bone material around a bone tunnel 862 may be weaker bone and tension on a tether 840 may cause the implant 1600 to subside into the bone tunnel 862. Alternatively, or in addition, the implant 1600 and a bone tunnel 862 may positioned near, or transverse to, an intramedullary canal of the bone (e.g., a first metatarsal 110) the shoulder 1618 can prevent the implant 1600 from subsiding or slipping into the intramedullary canal after deployment.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, Figure, or description thereof for the purpose of streamlining the disclosure. This method of disclosure, however, is not to be interpreted as reflecting an intention that any claim require more features than those expressly recited in that claim. Rather, as the following claims reflect, inventive aspects can exist alone and/or in a combination of fewer than all, or all, features of any single embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. § 112 Para. 6. It will be apparent to those having skill in the art that changes may be made to the details of the above-described embodiments without departing from the underlying principles set forth herein.

While specific embodiments and applications of the present disclosure have been illustrated and described, it is to be understood that the scope of this disclosure is not limited to the precise configuration and components disclosed herein. Various modifications, changes, and variations which will be apparent to those skilled in the art may be made in the arrangement, operation, and details of the methods and systems of the present disclosure set forth herein without departing from it spirit and scope.

It should be appreciated that in the above description of embodiments, various features are sometimes grouped together in a single embodiment, Figure, or description thereof for the purpose of streamlining the disclosure. This method of disclosure, however, is not to be interpreted as reflecting an intention that any claim require more features than those expressly recited in that claim. Rather, as the following claims reflect, inventive aspects can be present in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Those of skill in the art will appreciate that the solutions provided in present disclosure may be accomplished with all, or less than all, of the components, structures, features, or aspects disclosed in the specification or illustrated in the figures in relation or a particular embodiment or claim.

What is claimed is:

1. An articular implant system for a metatarsophalangeal joint, adjacent to a metatarsal of a patient, the system comprising:
   an implant configured to seat within a bone pocket of an articular surface of a metatarsal, the implant comprising:
      a convex distal surface;
      a semispherical proximal surface that extends from the convex distal surface, the semispherical proximal surface having an implant radius that matches a bone radius of the bone pocket; and wherein the semispherical proximal surface engages a surface of the bone pocket to retain the implant within the bone pocket.

2. The articular implant system of claim 1, further comprising:

a tether comprising a distal end and a proximal end, the distal end configured to connect the tether to the implant;

an anchor configured to secure the proximal end of the tether to the metatarsal away from the bone pocket; and wherein the anchor and tether adjunctively secure the implant to the metatarsal.

3. The articular implant system of claim 1, wherein the convex distal surface comprises a joint-facing articular surface.

4. The articular implant system of claim 1, wherein, with the semispherical proximal surface engaged with the surface of the bone pocket, the convex distal surface is configured to be encircled by a natural articular surface.

5. The articular implant system of claim 1, wherein the implant is configured to replace less than all of the articular surface of the metatarsal.

6. The articular implant system of claim 1, wherein the semispherical proximal surface meets convex distal surface at a circular edge that defines a perimeter of the implant.

* * * * *